US011729464B2

(12) United States Patent
Barnum

(10) Patent No.: US 11,729,464 B2
(45) Date of Patent: Aug. 15, 2023

(54) METHODS AND SYSTEMS FOR TRANSITION-CODED MEDIA, MEASURING ENGAGEMENT OF TRANSITION-CODED MEDIA, AND DISTRIBUTION OF COMPONENTS OF TRANSITION-CODED MEDIA

(71) Applicant: Capital One Services, LLC, McLean, VA (US)

(72) Inventor: Eric K. Barnum, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/858,055

(22) Filed: Apr. 24, 2020

(65) Prior Publication Data
US 2021/0337269 A1 Oct. 28, 2021

(51) Int. Cl.
G06F 16/00 (2019.01)
H04N 21/442 (2011.01)
G06F 16/435 (2019.01)
G06F 16/483 (2019.01)
G06F 16/41 (2019.01)

(52) U.S. Cl.
CPC ....... *H04N 21/44222* (2013.01); *G06F 16/41* (2019.01); *G06F 16/435* (2019.01); *G06F 16/483* (2019.01)

(58) Field of Classification Search
CPC . H04N 21/44222; G06F 16/435; G06F 16/41; G06F 16/483
USPC ................................................ 707/600–899
See application file for complete search history.

(56) References Cited

U.S. PATENT DOCUMENTS

| | | | |
|---|---|---|---|
| 5,890,152 | A | 3/1999 | Rapaport et al. |
| 7,176,888 | B2 | 2/2007 | Marvit et al. |
| 7,653,761 | B2 | 1/2010 | Juster et al. |
| 7,895,076 | B2 | 2/2011 | Kutaragi et al. |
| 9,148,643 | B2 | 9/2015 | Walker et al. |
| 9,264,764 | B2 | 2/2016 | Bhatia |
| 9,824,145 | B1 | 11/2017 | Rohrweck |
| 10,140,628 | B2 | 11/2018 | Pradeep et al. |
| 10,250,520 | B2 | 4/2019 | Imes et al. |
| 10,484,327 | B1 | 11/2019 | Wheeler et al. |
| 10,565,894 | B1 | 2/2020 | Jain et al. |

(Continued)

OTHER PUBLICATIONS

International Search Report and Written Opinion in corresponding Application No. PCT/US2021/027796, dated Aug. 6, 2021 (15 pages).

*Primary Examiner* — Irete F Ehichioya
*Assistant Examiner* — Shirley D Hicks
(74) *Attorney, Agent, or Firm* — Bookoff McAndrews, PLLC

(57) ABSTRACT

Disclosed are methods, systems, and non-transitory computer-readable medium for transition-coded media, measuring engagement of transition-coded media, and distribution of components of transition-coded media. For instance, the method may include: obtaining a media file; determining whether the media file includes transition-coded media; in response to determining the media file includes the transition-coded media, setting up a dynamic media environment; detecting whether a user is interacting with the transition-coded media; and in response to detecting the user is interacting with the transition-coded media, executing the transition-coded media with the dynamic media environment.

18 Claims, 19 Drawing Sheets

(56) References Cited

U.S. PATENT DOCUMENTS

| | | |
|---|---|---|
| 2009/0197582 A1 | 8/2009 | Lewis et al. |
| 2014/0047073 A1* | 2/2014 | Beme ................... H04L 65/75 |
| | | 709/219 |
| 2014/0337868 A1 | 11/2014 | Garza et al. |
| 2017/0289596 A1* | 10/2017 | Krasadakis ........... H04W 4/021 |
| 2018/0167686 A1* | 6/2018 | James ................ H04N 21/4725 |
| 2018/0288473 A1 | 10/2018 | Grover |
| 2018/0343476 A1 | 11/2018 | Loheide et al. |
| 2019/0200120 A1 | 6/2019 | Lang |
| 2019/0342602 A1 | 11/2019 | Aimone et al. |
| 2019/0354552 A1* | 11/2019 | Maharajh ............... H04H 60/91 |
| 2019/0373330 A1* | 12/2019 | Bloch ................. H04N 21/4532 |
| 2020/0014848 A1 | 1/2020 | Gove |
| 2020/0090214 A1 | 3/2020 | Tushinskiy |

* cited by examiner

METHODS AND SYSTEMS FOR TRANSITION-CODED MEDIA, MEASURING ENGAGEMENT OF TRANSITION-CODED MEDIA, AND DISTRIBUTION OF COMPONENTS OF TRANSITION-CODED MEDIA

TECHNICAL FIELD

Various embodiments of the present disclosure relate generally to methods and systems for media and, more particularly, to methods and systems for transition-coded media, measuring engagement of transition-coded media, and distribution of components of transition-coded media.

BACKGROUND

Generally, a user may interact with media, such as listen to media, read/view media, feel media, etc. Further, content consumption of media (e.g., entertainment, advertising, information, etc.) may be moving towards 3D and 3D+ consumption experiences. For instance, print media (e.g., books/advertising material) may increasingly be available in a digital format, while numerous other media types (e.g., audio, visual, and audio/visual content) may be readily available in digital format. One challenge in content consumption in 3D and 3D+ consumption experiences may be understanding and/or enhancing content consumption. Moreover, another challenge in content consumption in 3D and 3D+ consumption experiences may be determining a user's reaction to the content. Furthermore, another challenge in content consumption in 3D and 3D+ consumption experiences may be in developing the media itself so that a desired user reaction is achieved.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods are disclosed for transition-coded media. For instance, a method may include: obtaining a media file; determining whether the media file includes transition-coded media; in response to determining the media file includes the transition-coded media, setting up a dynamic media environment; detecting whether a user is interacting with the transition-coded media; and in response to detecting the user is interacting with the transition-coded media, executing the transition-coded media with the dynamic media environment.

A system may include a memory storing instructions, and a processor executing the instructions to perform a process. The process may include: obtaining a media file; determining whether the media file includes transition-coded media; in response to determining the media file includes the transition-coded media, setting up a dynamic media environment by: obtaining location data for the dynamic media environment, the location data including information about one or more dynamic media environment enabled devices, and initializing the one or more dynamic media environment enabled devices; detecting whether a user is interacting with the transition-coded media; and in response to detecting the user is interacting with the transition-coded media, executing the transition-coded media with the dynamic media environment.

A method may include: obtaining a media file; determining whether the media file includes transition-coded media; in response to determining the media file includes the transition-coded media, setting up a dynamic media environment; detecting whether a user is interacting with the transition-coded media; and in response to detecting the user is interacting with the transition-coded media, executing the transition-coded media with the dynamic media environment by: tracking a progress of a media element of the transition-coded media and a user state; based on the tracking of the progress of the media element and the user state, determining whether a trigger event occurs; in response to determining the trigger event occurs, determining an transition action based on the trigger event; and performing the transition action.

According to certain aspects of the disclosure, systems and methods are disclosed for measuring engagement of transition-coded media. For instance, a method may include: obtaining a media file; determining whether the media file includes transition-coded media; in response to determining the media file includes the transition-coded media, establishing a dynamic media environment; detecting whether a user is interacting with the transition-coded media; in response to detecting the user is interacting with the transition-coded media, executing the transition-coded media with the dynamic media environment; and while executing the transition-coded media, performing a baseline engagement process to obtain a baseline engagement of the user.

A system may include a memory storing instructions, and a processor executing the instructions to perform a process. The process may include: obtaining a media file; determining whether the media file includes transition-coded media; in response to determining the media file includes the transition-coded media, establishing a dynamic media environment; detecting whether a user is interacting with the transition-coded media; in response to detecting the user is interacting with the transition-coded media, executing the transition-coded media with the dynamic media environment; and while executing the transition-coded media: obtaining a baseline engagement of the user; and performing a reaction trigger process.

A method may include: obtaining a media file; determining whether the media file includes transition-coded media; in response to determining the media file includes the transition-coded media, establishing a dynamic media environment; detecting whether a user is interacting with the transition-coded media; in response to detecting the user is interacting with the transition-coded media, executing the transition-coded media with the dynamic media environment; and while executing the transition-coded media: performing a baseline engagement process to obtain a baseline engagement; and after obtaining the baseline engagement, performing a reaction trigger process.

According to certain aspects of the disclosure, systems and methods are disclosed for distribution of components of transition-coded media. For instance, a method may include: hosting a service for components of one or more transition-coded media, the components including one or more of: engagement index information for a type of media, engagement profiles for effects and/or dynamic processes, registration information, or modification information; receiving a request from a user device; determining whether the request includes a search request, a component request, or a data request; and based on the determining, performing one or more of a search process, a component serve process, and/or a data serve process, in accordance with the request including the search request, the component request, and/or the data request, respectively.

A system may include a memory storing instructions, and a processor executing the instructions to perform a process. The process may include: hosting a service for components of one or more transition-coded media, the components including one or more of: engagement index information for a type of media, engagement profiles for effects and/or dynamic processes, registration information, or modification information; receiving a data input message from a user device; extracting a component identifier and new media engagement information from the data input message; determining whether one or more of the components has a matching identifier to the component identifier; in response to determining the one or more of the components has a matching identifier, obtaining media engagement data for the one or more of the components that have the matching identifier; and in response to obtaining the media engagement data, updating the media engagement data based on the new media engagement information.

A method may include: hosting the service for the components of one or more transition-coded media; receiving a data input message from a user device; in response to receiving the data input message, performing a media engagement update process to update media engagement information for one or more components of the components; receiving a request from another user device; in response to receiving the request, performing a reporting process to report the updated media engagement information for the one or more components of the components.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
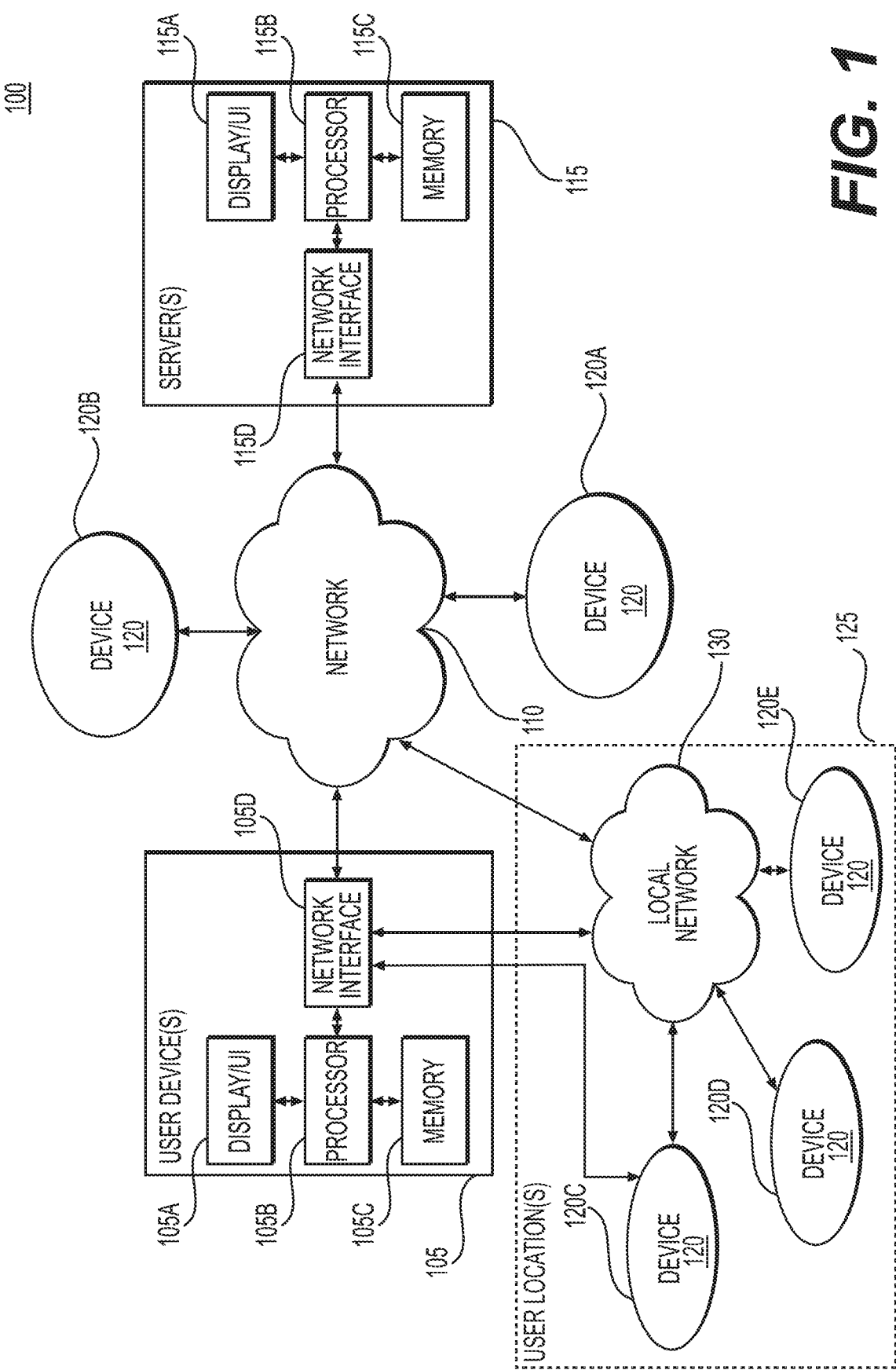
FIG. 1 depicts an exemplary block diagram of a system for transition-coded media, measuring engagement of transition-coded media, and distribution of components of transition-coded media, according to one or more embodiments.

Various embodiments of the present disclosure relate generally to systems and methods for media.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure is directed to systems and methods for transition-coded media, measuring engagement of transition-coded media, and distribution of components of transition-coded media. For instance, a user device of the present disclosure may enable a user to interact with a media file that includes tags that may instruct the user device and/or one or more secondary devices to perform functions to immerse a user in the content of a media file. Therefore, a user's experience of a transition-coded media may enhance content consumption of a media file.

Moreover, the user device and the one or more secondary devices, in accordance with the tags of the media file, may track a user's state and (1) perform actions on a conditional basis of the user's state; (2) change the content of the media file based on the user's state; and/or (3) provide reaction data to a server. Therefore, the user device may enable user-specific experiences of transition-coded media and enable authors (e.g., authors of tags) to track how effective the media file and tags are causing users to react.

Additionally, the user device may track the user's state to determine how engaged the user is with the content (in general and characters/object/sections of media files in particular). Therefore, authors may be informed of how effective content of the media file and/or a component (e.g., a particular tag) is at causing change in a user's state.

Lastly, a server may host a marketplace to gather and publish data for components and distribute components to authors and end users. The published data may indicate an average user reaction to a media file and/or tag. The distributed components may enable authors to include tags into their transition-coded media to enhance a user's experience. Therefore, transition-coded media may be developed quickly and tracked for effectiveness.

FIG. 1 depicts an exemplary block diagram of a system 100 for transition-coded media, measuring engagement of transition-coded media, and distribution of components of transition-coded media, according to one or more embodiments. The system 100 may include one or more user device(s) 105, a network 110, one or more server(s) 115, a plurality of devices 120 (including 120A-120E), one or more user location(s) 125, and/or one or more local network (s) 130. Hereafter, while the one or more server(s) 115 and the plurality of devices 120A-120E may interact with one or a plurality of the one or more user devices 105, this description will refer to the one or more user devices 105 as "the user device 105," so as to simplify the description of the concepts described herein. One of skill in the art would recognize that the one or more server(s) 115 may configure the one or more user devices 105 as to experience different functionalities and/or have access to different information (e.g., based on user settings, subscriptions, purchases, etc.). Additionally, while the functionality carried out by the one or more server(s) 115, the plurality of devices 120A-120E and/or the user device 105 are discussed herein separately, in practice these features may be executed on more or fewer devices.

The user device 105, the one or more server(s) 115, and the plurality of devices 120A-120E may be connected via the network 110 and/or via the one or more local network(s) 130, using one or more standard communication protocols. The network 110 may be one or a combination of a wide area network (e.g., the Internet), an enterprise network, or other network. The user device 105, the one or more server(s) 115, and the plurality of devices 120A-120E may transmit and receive messages from each other across the network 110 and/or the one or more local network(s) 130.

The user device 105 may include a display/user interface (UI) 105A, a processor 105B, a memory 105C, and/or a network interface 105D. The user device 105 may be a computer, a cell phone, a tablet, an electronic reader, a television, an automated teller machine (ATM), etc. The user device 105 may execute, by the processor 105B, an operating system (O/S) and at least one application (each stored in memory 105C). The application may be a personal computer (e.g., desktop or laptop) program that enables a user to interact with media files; a browser program (e.g., on a personal computer) that enables a user to interact with media files (e.g., by streaming of the media file); an application on an Automated Teller Machine (ATM) that enables a user to interact with media files (e.g., ads or other content associated with the ATM, such as banking information); an application on a television that enables a user to interact with media files; or a mobile application program (which may also be a browser program in a mobile O/S) that enables a user to interact with media files (streaming or otherwise). The application may generate one or more graphic user interfaces (GUIs) based on instructions/information stored in the memory 105C, instructions/information received from the one or more server(s) 115, and/or instructions/information received from the plurality of devices 120A-120E. For instance, the GUIs might be application GUIs for the application executed based on XML and Android programming languages or Objective-C/Swift, but one skilled in the art would recognize that this may be accomplished by other methods, such as webpages executed based on HTML, CSS, and/or scripts, such as JavaScript. The display/UI 105A may be a touch screen or a display with other input systems (e.g., mouse, keyboard, etc.). The network interface 105D may be a TCP/IP network interface for, e.g., Ethernet or wireless communications with the network 110. The processor 105B, while executing the application, may receive user inputs from the display/UI 105A, and perform actions or functions in accordance with the application.

The application, executed by the processor 105B of the user device 105, may (1) display a graphical user interface (GUI) on the display/UI 105A for a transition-coded media process and/or (2) execute the transition-coded media process without displaying a GUI on the display/UI 105A. The application may store user data on the user device 105. The user data may include user identifiers (ID) for users of the user device 105; baseline engagement for each of the user IDs (if established); reaction dataset(s) (discussed below) for each of the user IDs; and/or user profiles for each of the user IDs. The user profiles including at least user preference data (discussed below) for the user ID of the user profile. The user data may also include user settings that indicate which dynamic media environment enabled devices and/or one or more actions are allowable.

The transition-coded media process may enable the user device 105 to obtain a media file and enable a user to interact with the media file, as discussed in more detail below. Generally, transition-coded media files may include a media element and one or more tags.

The media element may be content to be displayed, content to be output as audio, etc. on the user device 105. The one or more tags may be associated to one or more progress points in the media element. The progress points may be indexed to a time track (if a data stream media element) or to specific portions of content (if a static media element). The specific portions of content may include sections, chapters, paragraphs, sentences, words or phrases; webpages or portions thereof, such as text, images, or other HTML elements; application features, such as text, images or other media; and/or regions of an image (left, right, top, bottom, etc.).

The tags may include one or more tag devices and, for each of the one or more tag devices, one or more actions. The tag devices may be the user device 105, devices 120 that have general hardware (device 120 has, e.g., speaker or display), and/or devices 120 that have specific hardware (device 120 has specific hardware to perform specific action). As an example, a tag may indicate a tag device that has specific hardware corresponding to an ice maker of a refrigerator, and an action might be to cycle the ice maker for a defined period of time.

Generally, a tag may be one or a combination of: an action tag, a reaction tag, a character tag, an object tag, and/or baseline engagement tags. The action tag may cause one or more devices from among the user device 105 and/or the devices 120A-120E to perform a defined function at particular point in time (e.g., instantaneous or at a point in the future), for a particular length of time (e.g., a defined number of seconds or repetitions). The reaction tag ("<reaction>") described in further detail below) may cause one or more devices from among the user device 105 and/or the devices 120A-120E to track a user's state and/or reaction, as discussed in more detail below in FIGS. 8-13. Additionally, the reaction tag may be associated (e.g., paired together at a same progress point) with any other tag to track a user's state and/or reaction to the other tag. The character tag may indicate a character is present in the story/movie/etc. to track a user's reaction to the character and/or the character actions. The object tag may indicate an object is present in the story/movie/etc. to track a user's reaction to/engagement with the object. The baseline engagement tags may indicate portion(s) of a media element that is acceptable to perform a baseline engagement process (discussed below).

Below is a non-exhaustive list of tags (in the form of extensible markup language (XML), but one of skill in the art would recognize that any markup language or data structure may be used indicate the one or more tag devices and, for each of the one or more tag devices, the one or more actions. Below is a non-exhaustive list of general function tags:

<media start> Informs the user device 105 that tags exist;

<media end> Tells the user device 105 that the media transitions are finished;

<environmental controls detect> The user device 105 discovers available environmental controls native to the device being used, such as cameras, flash, backlighting, battery/heat, speakers, pressure;

<environmental controls report> Provides a listing of detected controls to the user device 105;

<media environmental default difference> Provides a listing of settings not available to the transition-coded media default due to device limitations;

<user specific environmental controls> User-initiated connections to the one or more of the plurality of devices 120A-120E (such as HVAC, room lighting, robotic massage chairs, room speakers, displays, other users' devices, etc.); and <reset> Initiates a reset to default setting.

Below is a non-exhaustive list of action tags:

<device> Initiates control over any particular device that is part of the user device 105, such as camera, speakers, microphone, screen, etc., and each of these would have their own functions;

<amplify> Initiates control over the magnitude of the device controlled, such as speakers become louder/quieter, etc.;

<percent> Initiates control over the default difference to adjust the difference, such as if the default backlight is 20%, the <percent> tag may adjust+/−1%;

<timing> Initiates control over when a device of the devices 120A-120E activates a function with sub-routines for "on" as # of seconds, "off" as immediate, and <increment> so that the device activation may ramp up over the time specified in "On=15 seconds;"

<programmed behavior> Initiates a cascade of pre-programmed controls that might activate multiple devices of the devices 120A-120E as a package, such as lights dim and AC reduces room temperature by 2 degrees;

<reaction> Initiates capture of the user's state/reaction during the reaction tag;

<link> Initiates a hyperlink to content; and

<prompt> Requests a user input as defined by the author, such as. "Like on Social Media", "More Info", "Share", "Survey."

The one or more actions may be defined by an author of the tag. A non-exhaustive list of actions may include: output a sound (custom or default for device 120); display image or video; turn on/off/change lighting; activate hardware (e.g., ice maker); etc. Generally, further actions may include: changing backlight or some other lighting of the user device 105 or one of the devices 120 (referred to as action devices discussed below); cause an onscreen alert to display on user device 105 or action device; cause vibratory alerts and other haptic feedback of user device 105 or action device; cause audio players to output defined sounds; change environment conditions (HVAC fan and/or temperature) by controlling a HVAC system; causing environmental lighting controls to adjust; muscle stim; 3D movement; virtual reality; or augmented reality, etc.

The tags may also include conditions (e.g., indicated by condition indicators of: true or false). The conditions may be arbitrarily complex as defined by an author. A condition may include a logical expression. The logical expression may include variables and logical operators (following an order of operations). The variables may correspond to the progress of the media element, bits of information of a user state (e.g., heart rate, alertness, etc., as defined by the author of the tag) from the tracking data, content of the media element (e.g., user's account status on a mobile application screen), and/or other contextual information (e.g., user's account status, a credit score, birthday, etc.). The logical operators may include "and," "or" (exclusive or inclusive), "not," "nand," and "nor," etc. If the condition returns satisfied, the tag may be executed.

The one or more server(s) 115 may include a display/UI 115A, a processor 1156, a memory 115C, and/or a network interface 115D. The one or more server(s) 115 may be a computer, system of computers (e.g., rack server(s)), and/or or a cloud service computer system. Hereafter, while the one or more server(s) 115 may interact with one or a plurality of the one or more user devices 105 and/or one or more of the plurality of devices 120A-120E, this description will refer to the one or more server(s) 115 as "the server 115," so as to simplify the description of the concepts described herein. The server 115 may execute, by the processor 1156, an operating system (O/S) and at least one instance of a server transition-coded media program (each stored in memory 115C). The server 115 may store or have access to server transition-coded media information (e.g., hosted on a third-party server). The display/UI 115A may be a touch screen or a display with other input systems (e.g., mouse, keyboard, etc.) for an operator of the server 115 to control the functions of the server 115 (e.g., update the server transition-coded media program and/or the server transition-coded media information). The network interface 115D may be a TCP/IP network interface for, e.g., Ethernet or wireless communications with the network 110.

The server transition-coded media program, executed by the processor 1156 on the server 115, may (1) coordinate with the plurality of devices 120A-120E to configure/update the plurality of devices 120A-120E; (2) coordinate with the user device 105 to interact with media files; and/or (3) coordinate with the user device 105 to create media files (when the user device 105 is an authoring device). Further details of the server transition-coded media program are discussed below. The server transition-coded media information may include analytics data based on user reactions to tags. The analytics data may include media engagement data and/or user preference data.

The media engagement data may include media file profiles and server-user profiles. Generally, the media engagement data includes a plurality of reaction datasets for all of the components hosted on the service. The media file profiles include reaction datasets for all components hosted on the service (e.g., for each component ID), stored in association with a media element. The media file profiles may provide high level user-anonymous data to indicate effectiveness of media files and components (e.g., tags, tag devices, and actions) to implement a dynamic media environment, and describes the component in a description or meta-data. The server-user profiles may include reaction datasets for all users of the service (e.g., for each user ID).

Each reaction dataset may include a user ID, a component ID, and/or reaction data. The reaction data may include a progress of the media element, a user state, and/or a user profile from a reaction message transmitted in response to a reaction trigger event of a reaction tag. The user ID may correspond to a user device 105 that transmitted the reaction message. The component ID may correspond to the reaction tag or a tag associated with the reaction tag (hereinafter, "reaction tag" for ease of reference). The user profile may store an average of the numerical values of the user state, an average user mode, and/or an average user mood ("baseline data"), user preferences in the user preference data, and detected deviations from the baseline data.

The media engagement data may also include averages and/or scores for a component ID. The averages and/or scores may be averages and/or scores of the reaction data for the component ID, such as an average/score of users' states, average/score of user profiles, and/or average/score of a difference between users' states and baseline states of the media file profiles. The averages and/or scores may indicate an effectiveness of a reaction tag or the tag associated with a reaction tag (such a character tag/object tag). The average/scores may be determined for each data type of the reaction data (heart rates, movement data, etc.). The server 115 may be determine the average of a data type based on an arithmetic mean function, geometric mean, or harmonic mean. The scores may be determined based on a scoring algorithm. The scoring algorithm may be multi-variable function or machine learning model that takes the averages and/or the plurality of datasets for a component ID as an input.

For each user ID, the user preference data may indicate a user's preference for types of media elements (e.g., visual over audio), a user's preference for sections of media elements (e.g., start, middle, end, particular pages/scenes/refrains, etc.), and/or a user's preference for particular content of media elements (e.g., a person/character of a story or video, objects, etc.), based on reaction data for the user ID. The server 115 may determine the user preference data based on user reactions to different types of media, different sections of a media element, and/or tags of the media element (e.g., the media element may include character tags/object tags). For instance, the server 115 may analyze user reactions while interacting with a media element using machine learning models to determine the user's preferences.

The server 115 may host a service, discussed in more detail in FIGS. 14-18 below. Generally, the service may be a market place to (1) gather data on components and (2) distribute components to implement transition-coded media. For instance, the service may enable access to one or combinations of: engagement index information for a type of media; engagement profiles for effects and/or dynamic processes; registration information, and/or modification information (e.g., "marketplace data"). The service may enable distribution of the marketplace data so that authors (e.g., some users of user devices 105) may generate transition-coded media with effective components by using frameworks of already defined tags. Moreover, authors of components (tags, action/tracking devices (such as devices 120A-120E), and actions) may review engagement index information and modify engagement profiles to determine effectiveness of components and media paths.

The engagement index information for the type of media may include summaries of media file profiles indicating responses of one or more user(s) to deployed transition-coded media and tags, action/tracking devices, and actions thereof. In this manner, data on how effective a tag, action/tracking devices, and actions may be published. Authors of transition-coded media may use the published data to quickly find a component by searching for a type of a component using the user device 105. As an example, the author may search for a particular type of action tag. The server 115 may transmit a search result including the published data and a link to the engagement profiles for components that match a search parameter. The author may then navigate, via the user device 105, to the engagement profile of a component; request, via the user device 105, a framework for the searched for component; receive the framework for the component (e.g., a tag) and edit the transition-coded media to include the framework for the component. In this manner, the author may make informed decisions about which components to use in the authoring process of a transition-coded media, and quickly include corresponding components in the transition-coded media.

The engagement profiles for the effects and/or the dynamic processes may include one or more action tag processes to generate specific effects and/or specific dynamic processes for a transition-coded media. Generally, the one or more action tag processes may provide a framework to insert a tag into a transition-coded media so that the transition-coded media includes a tag with one or more tag devices and, for each of the one or more tag devices, one or more actions. The framework may or may not be editable by the author. The author of the engagement profile selected by a secondary author may receive a consideration (e.g., money or benefits, such as a reduction in a subscription fee for the service), or the author may make the engagement profile available freely without consideration. The deployed tag based on the framework in a transition-coded media may report user reaction data for the deployed tag as discussed below in FIG. 18; moreover, the user reaction data for the deployed tag may also report user reaction data for an original tag that was the basis of the engagement profile, thereby increasing data available to indicate effectiveness of a corresponding engagement index information.

The registration information may include information to register a device to interact with a transition-coded media. Once a device is registered (e.g., a tracking and/or action device such as devices 120A-120E), user devices such as the user device 105 may execute a search process for dynamic media environment enabled devices and interact with the registered device.

The modification information may include information to modify a device to be able to interact with the transition-coded media. For instance, the modification information may include a management application and one or more function applications. The management application may control the modified device to handle processing of messages to and from user devices 105/the server 115. Meanwhile, the one or more function applications may control the device to execute a tracking function and/or an action function (discussed below). End users of the service may download the modification information and update devices that previously did not provide a tracking function and/or an action function in the dynamic media environment so that the devices may provide a tracking function and/or an action function.

The plurality of devices 120A-120E may be tracking devices and/or action devices, depending on whether the plurality of devices 120A-120E have a tracking function and/or an action function enabled. The plurality of devices 120A-120E may be any device that is: (1) enabled to communicate with a user device 105 directly or indirectly, and (2) includes hardware to execute a tracking function and/or an action function (stored on a memory of the device 120 and executed on a processor of the device 120). For instance, the plurality of devices 120A-120E may include one or combinations of: a cell phone, a smart phone, an AR goggle, a VR goggle, a tablet, a laptop, a desktop computer, Internet of things (IoT) devices (e.g., such as a refrigerator, an oven, a dishwasher, any other kitchen appliance, a washer, a dryer, a HVAC system, a security system, a connected voice controller, a connected speaker, a connected doorbell, a connect light, and/or a connected switch), and/or an audio-visual computer equipment. The plurality of devices 120A-120E may also include one or more of the one or more user device(s) 105 (when set as a tracking device or action device).

The plurality of devices 120A-120E may be tracking devices if the plurality of devices 120A-120E have hardware to execute a tracking function and the tracking function is enabled. The tracking function may use the hardware to obtain tracking data. The tracking data may include different types of tracking data. The hardware to obtain tracking data may include: a microphone to record sound; a camera to record images, such as pictures or video, with an image/video analyzer (e.g., a machine learning model) to detect persons and their mode and/or mood; haptic sensors to sense user touch or proximity; health sensors to measure body states (e.g., a heart rate monitor, etc.); accelerometer/gyroscope/GPS to track movement and/or orientation of the user/user device 105; and/or thermometer to detect ambient temperature or user temperature. The tracking devices may process the tracking data to determine a user state and/or environment data. The user state may include values for user characteristics based on the tracking data. The values may be a current value (e.g., based on most recently received information) or a data stream of values for the user characteristics indexed to a time of a system clock of the user device 105. The tracking device(s) and the user device 105 may be time synced so the values may be correctly indexed to when the tracking device obtained the bit of information. The user characteristics may include (1) user mode indicator indicating the user is one or more of talking, singing, sitting, standing, moving, at rest (e.g., reclining), etc.; (2) user mood (happy, sad, angry, restless, impatient, etc.); and/or (3) user physiological state (e.g., heart rate, body temperature, perspiration, etc.). The environment data may include ambient noises, lighting, and/or temperature.

Moreover, for static media elements (e.g., e-books, webpages, static content on features of the application), the user device 105 and/or devices 120 may track a user's progress through the static media element. For instance, the user device 105 and/or devices 120 may track the user's progress through the static media element by tracking user inputs (e.g., into to turn page of e-book, webpage navigation, feature navigation of the application, inputs on sections (e.g., area of display) of the content, etc.) and/or tracking a user's attention (e.g., by eye tracking on the content).

The plurality of devices 120A-120E may be action devices if the plurality of devices 120A-120E have hardware to execute an action function and the action function is enabled. The action function may use the hardware to execute activation mechanisms. The hardware to execute activation mechanisms may be any electrical and/or mechanical system of the device 120 that can output sound, vibration, light, images, video, scents, taste, or any combination thereof.

The one or more user location(s) 125 may geographic locations associated with a user device 105 and/or one or more of the plurality of devices 120A-120E. For instance, a user device 105 may be associated with a user location 125 that is a home, work, vehicle, etc. of a user of the user device 105. The user location 125 may have a data structure that includes associated user device information and associated device information. The associated user device information may indicate user devices 105 associated with the user location 125, such as users that are a part of a family (or any group of users) that have one or more user devices 105. The associated device information may indicate one or more of the plurality of devices 120A-120E associated with the user location 125, such as devices 120C, 120D, and 120E of user location 125, as shown in FIG. 1. The devices 120C, 120D, and 120E may be associated with the user location 125 by being on a same local network 130 of the user location 125 and/or by being within a threshold distance of a user device 105. Further details of one or more user locations 125 are discussed below.

Figure 2:
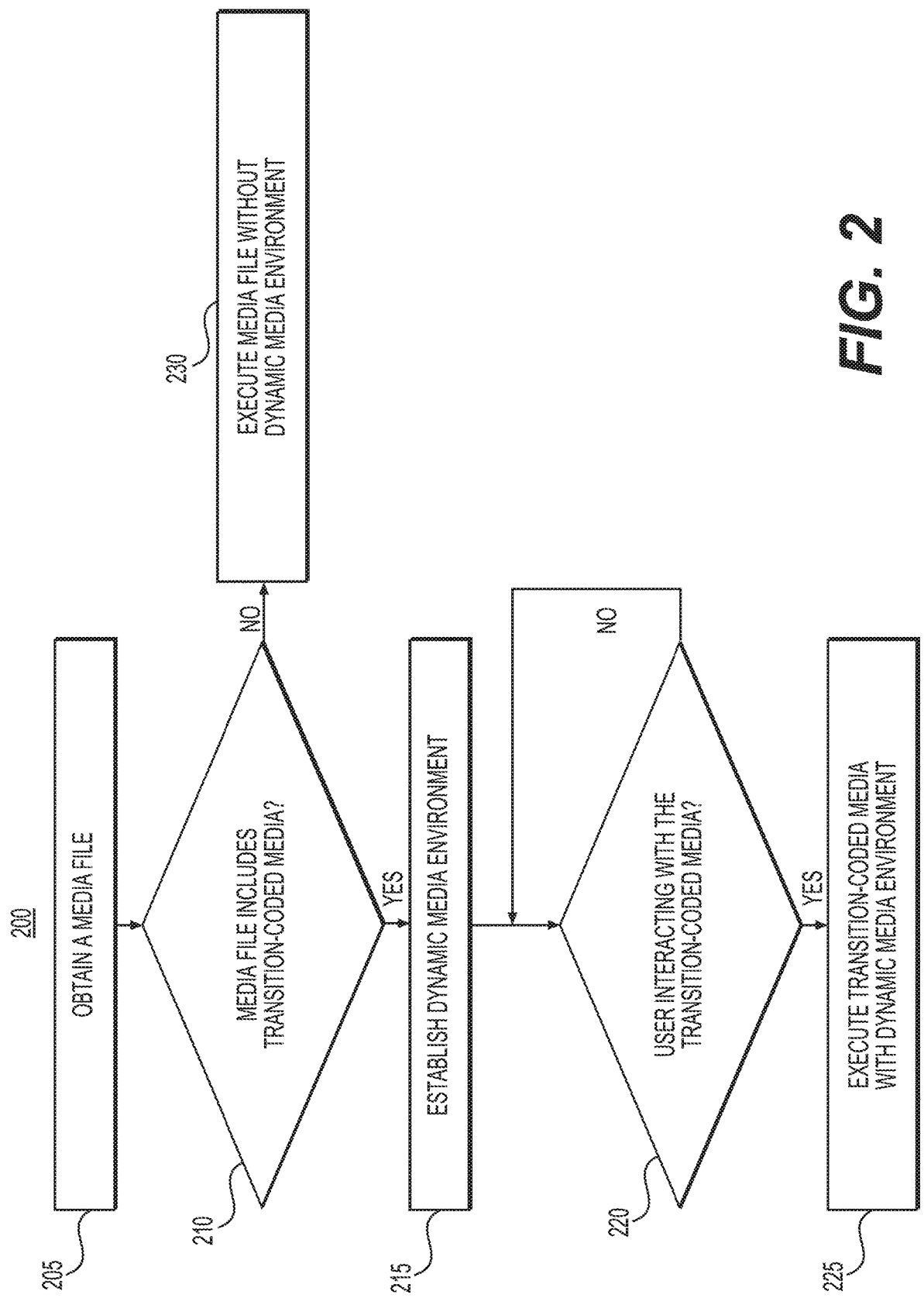
FIGS. 2-7 depict flowcharts for transition-coded media, according to one or more embodiments.

FIGS. 2-7 depict flowcharts for transition-coded media, according to one or more embodiments. FIG. 2 may depict a flowchart 200 for enabling a user to interact with a media file. Generally, the user device 105 and none, one, or more of plurality of devices 120A-120E acting as tracking devices and/or action devices may cooperate to enable a user to interact with a media file. The user device 105 may execute the application to interact with the media file, and the tracking devices and/or action devices may execute tracking functions and/or action functions, respectfully.

The user device 105 may start the process of the flowchart 200 by obtaining a media file (block 205). For instance, the user device 105 may obtain the media file by downloading or streaming the media file from the server 115 or another server or user device. For instance, the user device 105 may download or stream the media file in response to a user input selecting a media file, or the user device 105 may download the media file in response to an instruction from, e.g., the server 115 so as to display an advertisement or other content on a television, display, or ATM.

The user device 105 may then proceed to determine whether the media file includes transition-coded media (block 210). For instance, the user device 105 may obtain the media file; open/parse the media file; determine whether media file includes a transition-coded media indicator; and, if so, determine the media file includes transition-coded media. The transition-coded media indicator may indicate the media file includes a media element and one or more tags for the media element.

In response to determining the media file does not include transition-coded media (block 210: No), the user device 105 may proceed to execute the media file without a dynamic media environment (block 230). For instance, the user device 105 may play music, play a video, display a photo, display an advertisement, etc. without the dynamic media environment. In response to determining the media file includes transition-coded media (block 210: Yes), the user device 105 may then proceed to establish the dynamic media environment (block 215). For instance, the user device 105 may establish the dynamic media environment as discussed below with reference to FIG. 4.

The user device 105 may then proceed to detect whether a user is interacting with the transition-coded media (block 220). For instance, the user device 105 may detect a user is interacting with the transition-coded media by determining (1) the user is using the application (in the case the content of the application is considered transition-coded media); (2) the user is using the application and the user selected the transition-coded media (e.g., directly by a user input selecting the transition-coded media or as a part of a playlist or other auto-start process); and/or (3) the user is using the application and the user is traversing (e.g., by turning pages of an e-book by user inputs, scrolling through content by user inputs, listening/viewing content, etc.) of the transition-coded media.

In response to not detecting the user is interacting with the transition-coded media (block 220: No), the user device 105 may proceed to return to detect whether the user is interacting with the transition-coded media (block 220). In response to detecting the user is interacting with the transition-coded media (block 220: Yes), the user device 105 may then proceed to execute the transition-coded media with the dynamic media environment (block 230). For instance, the user device 105 may execute the transition-coded media with the dynamic media environment, as discussed below in FIG. 3.

Figure 3:
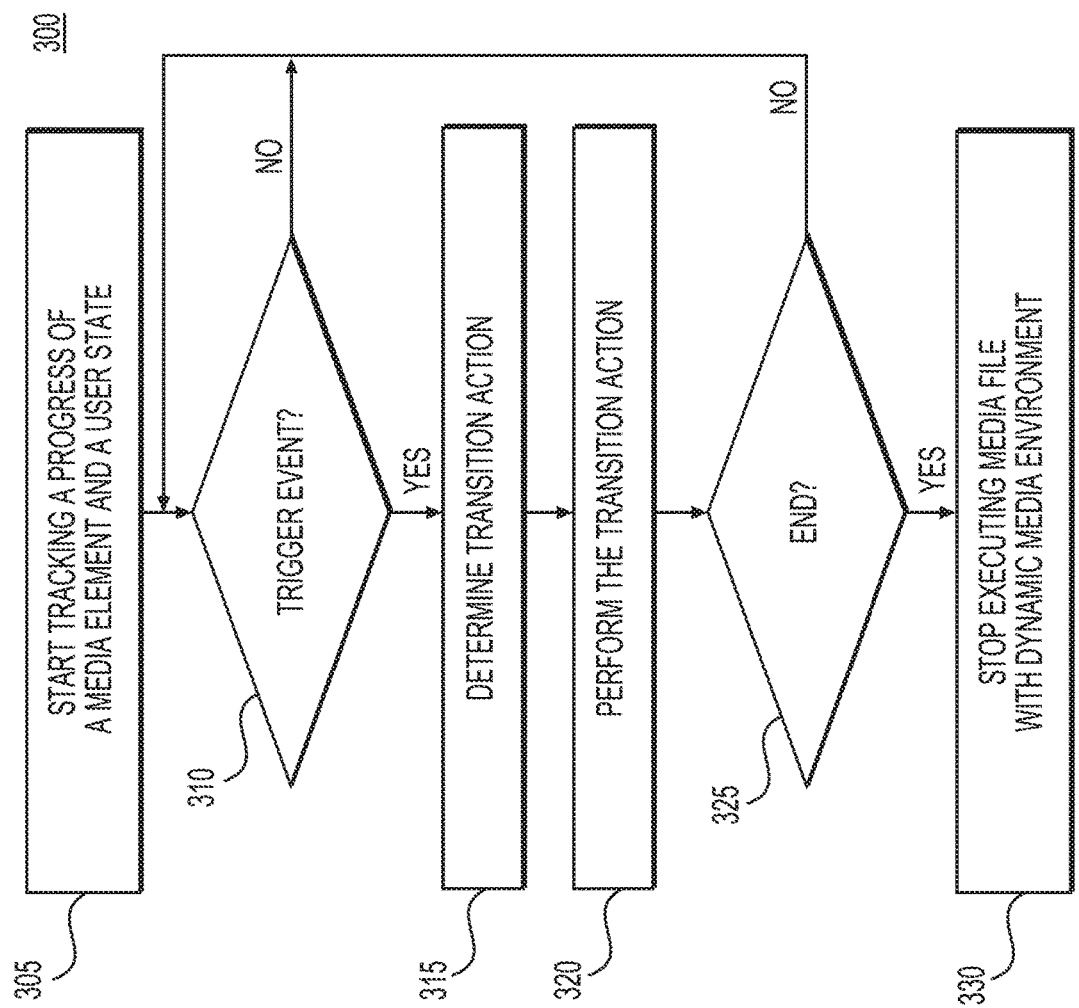

FIG. 3 depicts a flowchart 300 for executing the transition-coded media with the dynamic media environment.

The user device 105 may start the process of the flowchart 300 by starting to track a progress of a media element and a user state (block 305). For instance, the user device 105 may track a progress of a media element and a user state as discussed below with reference to FIG. 5.

The user device 105 may then proceed to determine whether a trigger event occurs (block 310). For instance, the user device 105 may determine whether a trigger event occurs as discussed below with reference to FIG. 6.

In response to determining a trigger event does not occur (block 310: No), the user device 105 may proceed to return to determining whether a trigger event occurs (block 310). In response to determining a trigger event occurs (block 310: Yes), the user device 105 may then proceed to determine a transition action (block 315). For instance, the user device 105 may determine a transition action as discussed below with reference to FIG. 7. Briefly, the user device 105 may determine the transition action based on a selection of available dynamic media environment enabled devices that match tag devices of the tag, and a selection of actions of the matching devices that match actions of the tag.

The user device 105 may then proceed to perform the transition action (block 320). For instance, the user device 105 may perform the transition action by generating instructions to perform the transition action, and either (1) executing the instructions on the user device 105 and/or (2) transmitting an instruction message to the selected matching devices. The instruction message may include the instructions to execute the transition action and/or time to execute the transition action.

The user device 105 may then proceed to determine whether the transition-encoded media has ended (block 325). In response to determining the transition-encoded media has not ended (block 325: No), the user device 105 may return to determine whether a trigger event occurs (block 310). In response to determining the transition-encoded media has ended (block 325: Yes), the user device 105 may stop executing the media file with the dynamic media environment (block 330).

Figure 4:
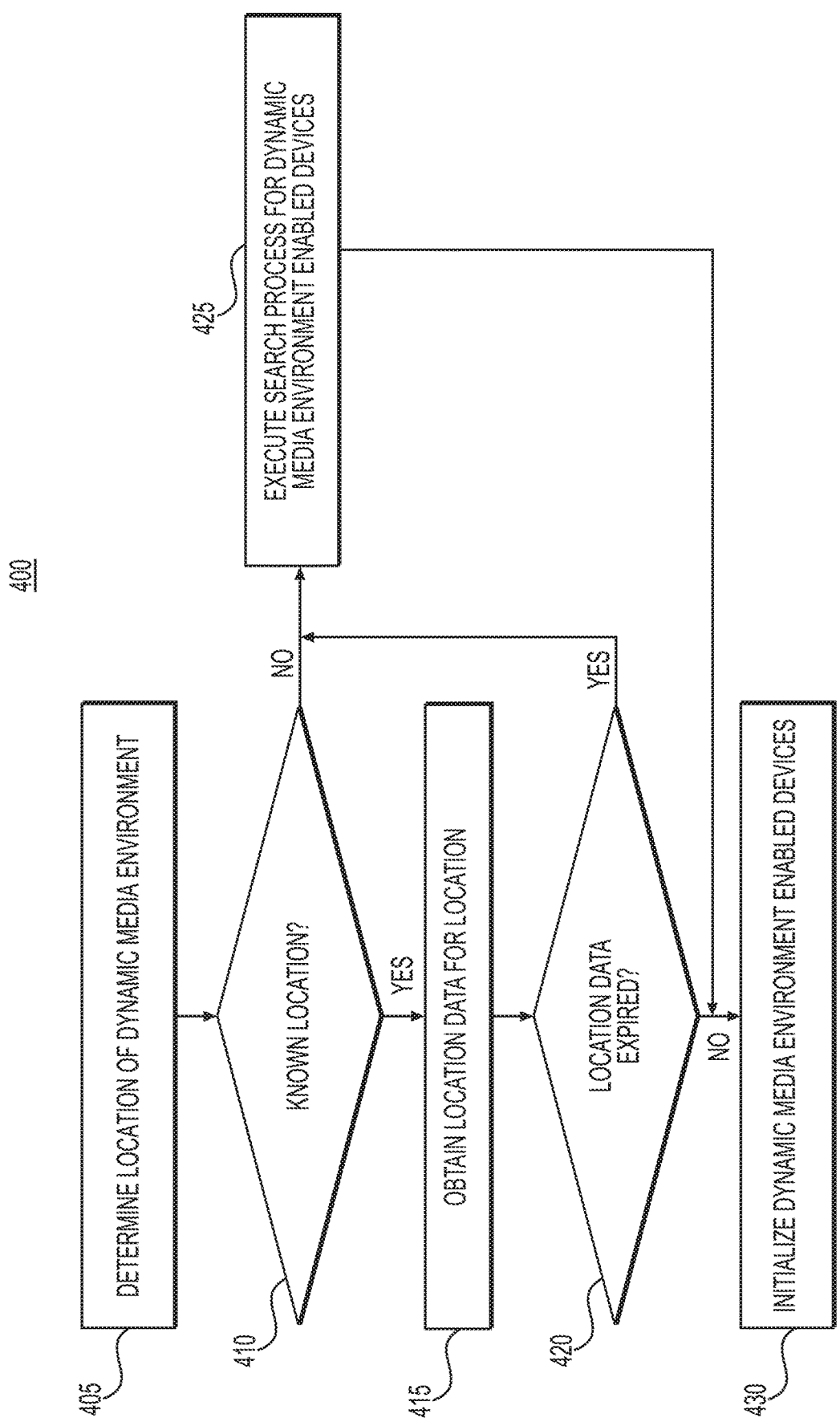

FIG. 4 depicts a flowchart 400 for establishing a dynamic media environment. The user device 105 may start the process of the flowchart 400 by determining a location of dynamic media environment (block 405). For instance, the user device 105 may determine the location of the dynamic media environment by: (1) determining which network the user device 105 is connected to and/or (2) obtaining a geographic position of the user device 105 based on a GPS signal.

The user device 105 may then proceed to determine whether the location is a known location (block 410). For instance, the user device 105 may determine whether the location is a known location by: obtaining known location information from, e.g., a memory (such as memory 105C) or from the server 115; extracting known networks and/or known positions from the known location information; determining whether the currently connected network is among the known networks (e.g., a local network 130) or whether the current geographic position is within a threshold distance to a known location (e.g., within 2, 5, 50 feet, etc.). The known locations may associated with devices 120. As an example, as discussed below, the user device 105 may be in near proximity (e.g., within the threshold distance) of a device 120 (such as a television or ATM) and the user device 105 may prompt the user of the user device 105 if the user does not show interest in content being displayed by the device 120.

In response to determining the location is not a known location (block 410: No), the user device 105 may proceed to execute a search process for dynamic media environment enabled devices (block 425). For instance, to execute a search process for dynamic media environment enabled devices, the user device 105 may transmit query messages on a local network 130 or directly to nearby devices 120 to discover devices 120; receive response messages from the devices 120 over the local network 130 or directly from the devices 120; extract tracking and/or action function information from the response messages for the devices 120 that responded; store the tracking and/or action function information as location data in association with the location and as a new location; and update the known location information with the new location (e.g., new network or new geographic position). In the future, this location may be determined as a known location and the search process may be omitted thereby reducing processing time and processing resources. The tracking and/or action function information may indicate tracking functions and/or action functions the devices 120 are capable of in the dynamic media environment. The user device 105 may then proceed to initialize dynamic media environment enabled devices (block 430), as discussed below.

In response to determining the location is a known location (block 410: Yes), the user device 105 may then proceed to obtain location data for the location (block 415). For instance, the user device 105 may retrieve the location data from the memory (e.g., memory 105C) by matching the current network or current position to a network or position from among a plurality of location data (each being associated with a network or position). The plurality of location data may include a timer for each location data that indicates how long ago a search process was executed for the location data.

The user device 105 may then proceed to determine whether the location data has expired (block 420). For instance, the user device 105 may determine whether the timer for the location data has exceeded an expiration threshold, which may be adjustable based on characteristics of the location (e.g., shorter time periods for locations that experience higher changes in devices 120 associated with the location, longer periods for locations that experience lower changes in devices 120 associated with the location).

In response to determining the location data has expired (block 420: Yes), the user device may execute the search process for dynamic media environment enabled devices (block 425). In this case, the search process may update the location data with the tracking and/or action function information received from devices 120 currently at the location. Therefore, the user device 105 may have a current understanding of the tracking functions and/or action functions for the devices 120.

In response to determining the location data has not expired (block 420: No), the user device may initialize dynamic media environment enabled devices (block 430). To initialize dynamic media environment enabled devices, the user device 105 may transmit, to the devices 120 of the tracking and/or action function information, initialization instructions to be prepared for potential further instructions from the user device 105. For instance, the potential further instructions may include tracking instructions and/or instructions to execute an action, in accordance with the transition-coded media. The devices 120, in response to initialization instructions, may be in stand-by mode (with or without indicating a change in state) so as to timely execute tracking and/or actions, and may continue in stand-by mode until an end instruction is received (e.g., transmitted by the user device 105 when the user device 105 stops executing the media file with the dynamic media environment).

Figure 5:
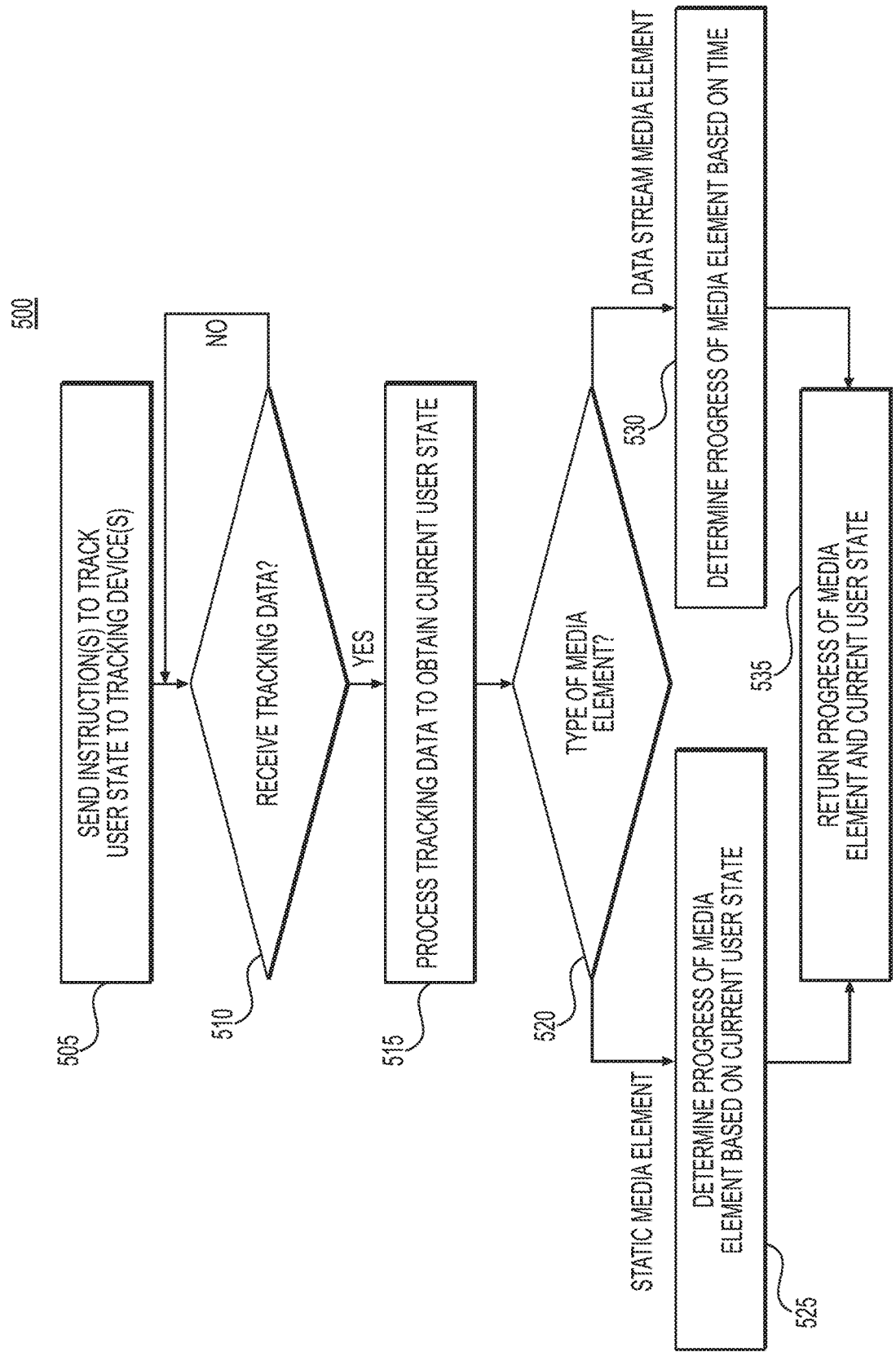

FIG. 5 depicts a flowchart 500 for tracking a progress of a media element and a user state for block 305 of FIG. 3. The user device 105 may start the process of the flowchart 500 by sending instruction(s) to track a user state to tracking device(s) (block 505). For instance, the user device 105 may obtain the tracking and/or action function information for the location; extract tracking devices and information about the tracking functions for the tracking devices from the tracking and/or action function information; and send instructions to one or more of the tracking devices to perform tracking in accordance to the tracking functions of the devices 120. Note, the user device 105 may also be a tracking device, so the "sending" may include transmitting an instruction from the application to a tracking function of the user device 105 to track the user state. The instruction may indicate an expiration time for the tracking (e.g., for the next period of time to track the user state) or may indicate that the devices 120 are to track the user state until an end tracking instruction is received (or an exit timer ends). The devices 120 may transmit tracking data continuously or periodically (e.g., multiple times a second, a minute, etc.) to the user device 105.

The user device 105 may then proceed to determine whether tracking data has been received (block 510). In response to determining tracking data has not been received (block 510: No), the user device 105 may proceed to return to determine whether tracking data has been received (block 510). In response to determining tracking data has been received (block 510: Yes), the user device 105 may then proceed to process tracking data to obtain a current user state (block 515). For instance, the user device 105 may parse the tracking data to obtain bits of information from the tracking data relevant to tags of the transition-coded media and/or store all tracking data for data analysis, as discussed below. For instance, if a tag indicates a heart rate of a user is an input to a condition of the tag, the user device 105 may parse out heart rate information from the tracking data; if the media element is static media element, the user device may extract a user's progress through the static media element.

The user device 105 may then proceed to determine a type of media element (block 520). For instance, the user device 105 may retrieve a media type ID from the transition-coded media, and determine whether the media element is a static media element or a data stream media element. A static media element may not be indexed to a time track, while data stream media element may be indexed to a time track. In response to determining the type of media element is a static media element (block 520: Static Media Element), the user device 105 may proceed to determine a progress of the media element based on the current user state (block 525). For instance, the user device 105 may determine the progress of the media element by determining the user's progress through the static media element from the tracking data. In response to determining the type of media element is a data stream media element (block 520: Data Stream Media Element), the user device 105 may then proceed to determine the progress of media element based on time (block 530). For instance, to determine the progress of a media element based on time, the user device 105 may determine the progress of the media element by determining a play time of the media element or current time of a timer.

The user device 105 may then proceed to return the progress of media element and the current user state (block 535). For instance, the user device 105 may then return to block 305 and continue to block 310.

Figure 6:
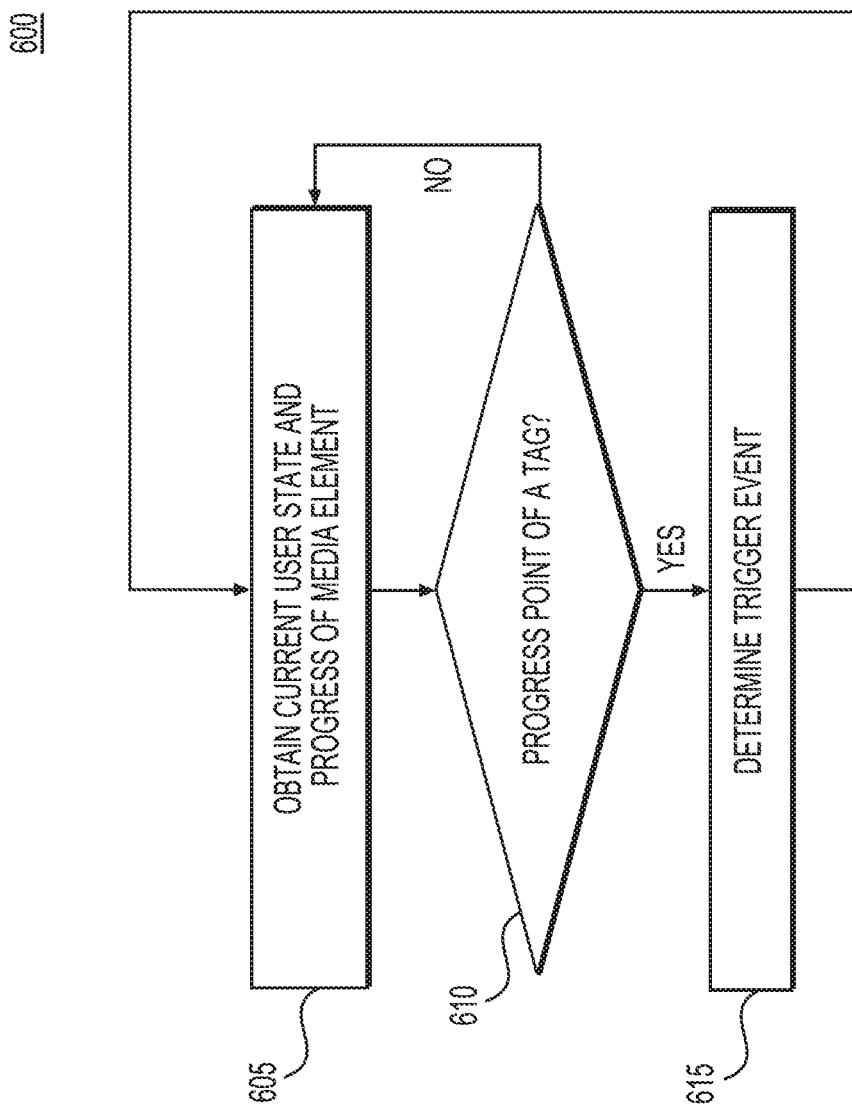

FIG. 6 depicts a flowchart 600 for determining whether a trigger event occurs for block 310 of FIG. 3. The user device 105 may start the process of the flowchart 600 by obtaining the current user state and progress of media element (block 605), as discussed above.

The user device 105 may then proceed to determine whether a progress point of a tag has been reached (block 610). For instance, the user device 105 may determine whether a progress point of a tag has been reached based on the progress of the media element. Specifically, the user device 105 may compare the progress of media element to progress points of the tags; and determine whether the indexed progress point (for a data stream media element) for a tag has been reached (and has not been passed over by a threshold amount of time (e.g., a second, a micro-second, etc.), or determine whether specific portions of content associated with a tag (for a static media element) is currently being viewed by a user.

In response to determining a progress point of a tag has not been reached (block 610: No), the user device 105 may proceed to obtain the current user state and the progress of media element (block 605). In response to determining a progress point of a tag has been reached (block 610: Yes), the user device 105 may then proceed to determine a trigger event for the tag (block 615). For instance, the user device 105 may determine the trigger event corresponds to the tag and pass the trigger event and tag to block 310 of FIG. 3 so that the user device 105 may proceed to block 315 of FIG. 3.

Figure 7:
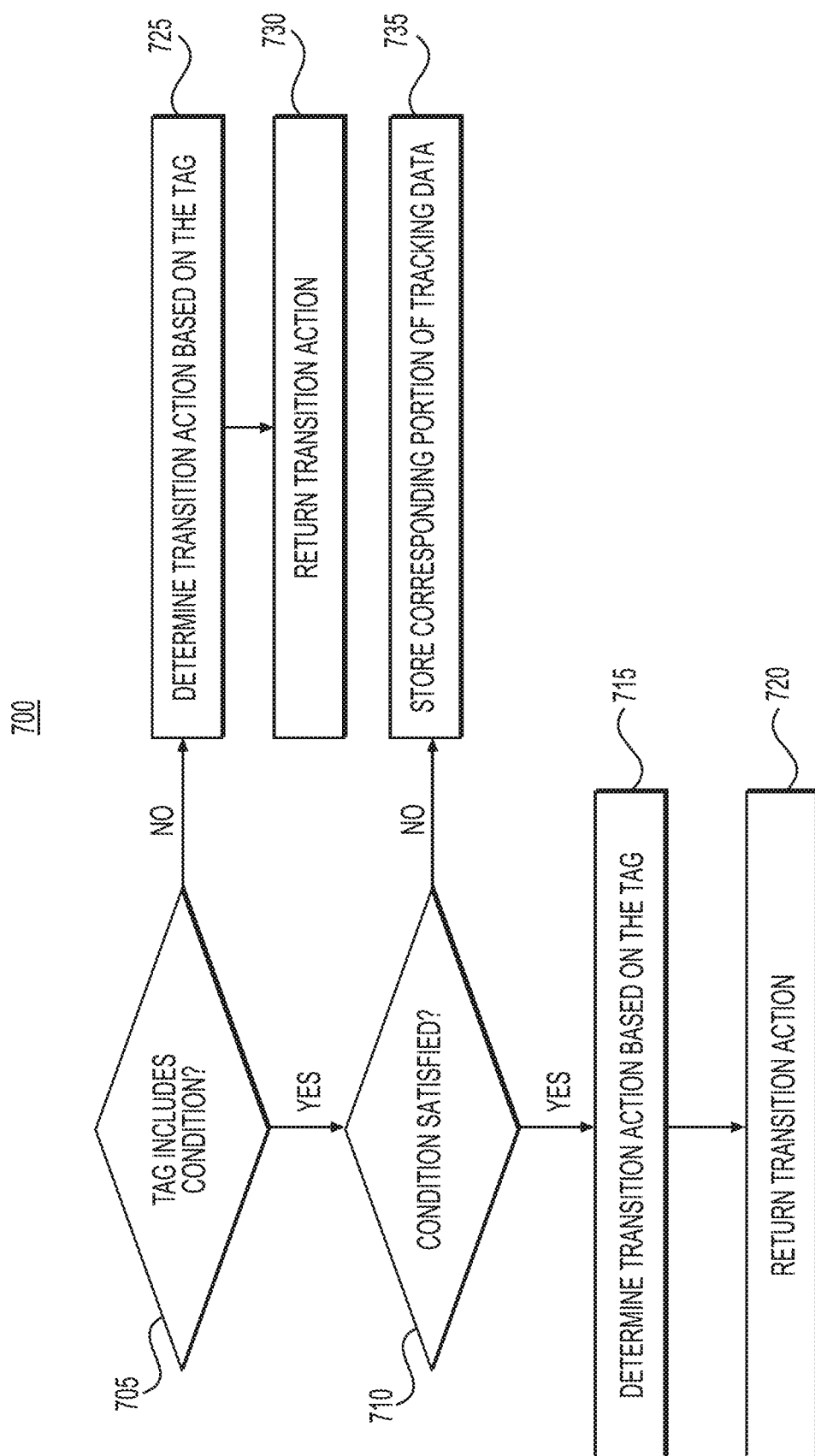

FIG. 7 depicts a flowchart 700 for determining a transition action for block 315 of FIG. 3. As discussed in FIG. 6, the trigger event and tag may be returned so that the user device 105 may determine a transition action. The user device 105 may start the process of the flowchart 700 by determining whether the tag includes a condition (block 705). For instance, the user device 105 may extract a condition indicator from the tag, and determine whether the condition indicator is true.

In response to determining the tag does not include a condition (block 705: No), the user device 105 may proceed to determine the transition action based on the tag (block 725). For instance, the user device 105 may extract information for one or more tag devices from the tag; compare the information for the one or more tag devices to information for available dynamic media environment enabled devices (e.g., for action devices from the tracking and/or action function information); determine matching devices based on a comparison result of the comparing the information for the one or more tag devices to information for the available dynamic media environment enabled devices (e.g., action devices such as the user device 105, devices 120 that have general hardware, and/or devices 120 that have specific hardware); and determine the transition action based on the matching devices. To determine the transition action based on the matching devices, the user device 105 may select one or the matching devices; and select an action of one or more actions of the tag that matches the actions possible for the action device. The user device 105 may then proceed to return the transition action (block 730). For instance, the user device 105 may then return to block 315 and continue to block 320.

In response to determining the tag does include a condition (block 705: Yes), the user device 105 may then proceed to determine whether the condition is satisfied (block 710). For instance, the user device may extract a logical expression from the condition of the tag; obtain bits of information from the tracking data (in accordance with the tag) and/or progress of the media element; set the bits of information from the tracking data and/or progress of the media element as the variables of the logical expression; and determine whether the logical expression is satisfied.

In response to determining the condition is not satisfied (block 710: No), the user device 105 may proceed to store a corresponding portion of the tracking data (block 735). For instance, the user device 105 may store in the user profile the corresponding portion to determine why the condition was not satisfied for feedback, as discussed below.

In response to determining the condition is satisfied (block 710: Yes), the user device 105 may then proceed to determine the transition action based on the tag (block 715). For instance, the user device 105 may proceed as in block 725 discussed above. The user device 105 may then proceed to return the transition action (block 720). For instance, the user device 105 may then return to block 315 and continue to block 320.

Examples of the systems and methods of this aspect of the disclosure:

Example 1: A User is listening to music on their phone. Because the music is transition-coded media, during solos the music uses the phone to detect indicators that the user is enjoying the solo, such as are they head banging during guitar riffs, are they signing along with the singer, and are they tapping to the beat? If yes, the music file could respond with certain actions: (1) enhance the sound of the guitar riff, or message the user a video of the guitar player playing that song; (2) the words of the song could display on their phone; (3) a story about or by the drummer describing what it's like to play that song is texted to the user. The user could "like" that section and set a preference based on available transition options.

Example 2: A user is reading a book on an e-reader. During scenes involving their favorite character, the user may grip the edges of their e-reader more tightly. The book may be transition-coded media and it may include a reaction tag to look for such reactions around key plot points with the story's characters. Detecting this for that character, backstory content may become available to the reader.

Example 3: A user has enabled all transitions for their movie night. The user lives in an integrated home having smart application link(s) to their HVAC, lighting, and entertainment center. The transition-coded media may: automatically dim the room's lighting by 10% at a first progress point and automatically lower the room's temperature by 2 degrees by instructing the HVAC system. A camera of their smart-TV, acting as a tracking device, may notice that the user is on the edge of their seat during a key battle scene, and a reaction tag may increase the special effects' sounds by 10%. Another action tag could (e.g., timed with an alien stalking a character) instruct a speaker in the kitchen to play the sounds of wet feet slapping against cold metal.

Example 4: A user has finished their transition-coded media and a transition summary may display showing things, such as: user seemed to enjoy the drum beat of this song; you accessed 10 of 56 transitions in this media; character A was your favorite character to character Z as your least favorite; and your favorite parts of this media were: X, Y, and Z.

Example 5: On a display adjacent to an ATM, information/images may be displayed (e.g., a card offering, highlighted by a celebrity or other spokesperson). The ATM may have a camera, and the ATM could be integrated into the display. During the user's interaction with the ATM, the camera (acting a tracking device) may detect that the user is looking at the information/images on the display; a reaction tag may be triggered by the user looking at the display causing a prompt to display on the ATM. For instance, the prompt may ask if the user would like more information.

Example 6: A user may be using their smartphone at the ATM of Example 5. In this example, instead of the reaction tag causing a prompt to display on the ATM (as the user device 105 executing transition-coded media), the reaction tag may cause a text message to be sent to the user's smartphone to ask if the user would like more information. The user may click a link in the text message to access a video of interactive content (which is transition-coded media as well, so the smartphone is also a user device 105). During the video of interactive content (as transition-coded media), the smartphone may track the user (user touch pressure increases when the celebrity or spokesperson talks about their personal use of the card; user increases volume during instructions (maybe they want to apply but are having a hard time?); user's eyes keep darting between their text messages and the content (maybe they are busy?)); a reaction tag may have a condition for if a user's mode is distracted, change media path to display video segment of the celebrity saying, "I sense you're busy. If you'd like, we can save this location for viewing at a later time?"

Example 7: A user is using a mobile application (e.g., a banking application) and the mobile application may be a transition-coded media. A camera may detect eyes or shapes around the user, and in response to a reaction tag may engage a privacy filter screen over the mobile application. A reaction tag may check a status of a user's account (e.g., by examining data on the screen of the mobile application and/or accessing a user's account) and, when the account is in a good status, change the user experience of the mobile application (e.g., soften lighting, etc.). For handicap users, reaction tags may detect and trigger screen experiences based on eye movement, hand tremble/pressure, etc.

Therefore, in this aspect of the disclosure, the systems and methods of the present disclosure may enhance content consumption of a media file. Besides for entertainment enhancements in content consumption, the systems and methods of the present disclosure may also enable authors of transition-coded media to provide user-specific experiences using tags with conditions. Moreover, the systems and methods of the present disclosure may enable authors to interact with users as the users interact with the transition-coded media, such as by routing users to additional materials (e.g., by links or prompts), providing an option to proceed at a different time (e.g., if distracted) or in a different channel (e.g., on mobile device instead of an ATM or TV), and/or provide specific feedback.

Figure 8:
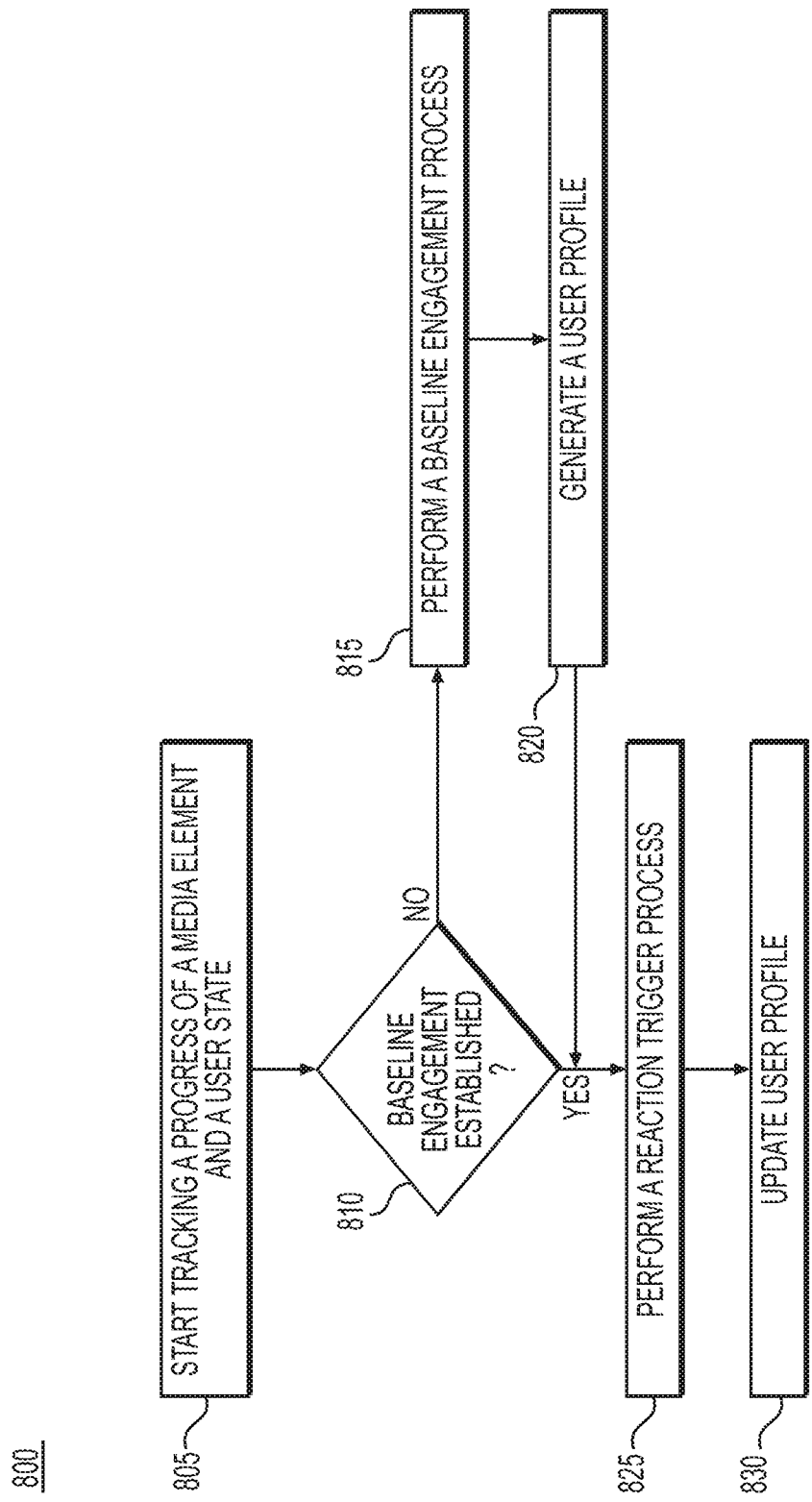
FIGS. 8-13 depict flowcharts for measuring engagement of transition-coded media, according to one or more embodiments.

FIGS. 8-13 depict flowcharts for measuring engagement of transition-coded media, according to one or more embodiments. FIG. 8 depicts a flowchart 800 for measuring engagement of transition-coded media. Generally, the user device 105 and none, one, or more of the plurality of devices 120A-120E acting as tracking devices and/or action devices may cooperate to enable a user to interact with a media file, measure engagement of transition-coded media of the user, and perform reaction actions.

The user device 105 may start the process of the flowchart 800 by starting to track a progress of a media element and a user state (block 805). For instance, the user device 105 may track the progress of a media element and the user state in the same manner as discussed above with respect to the flowchart 500 of FIG. 5.

The user device 105 may then proceed to determine whether a baseline engagement has been established (block 810). For instance, the user device 105 may obtain a user ID for a user currently using the user device 105 (e.g., by determining which user is logged in to the application or currently active profile, etc.); obtain the user data; determine whether the user data includes a baseline engagement for the user ID; if so, determine the baseline engagement has been established; and if not, determine the baseline engagement has not been established.

In response to determining the baseline engagement has not been established (block 810: No), the user device 105 may proceed to perform a baseline engagement process (block 815). For instance, the user device 105 may perform a baseline engagement process as discussed below with reference to FIG. 9. A baseline engagement may include an average of numerical values of the user state, an average user mode, and/or an average user mood.

The user device 105 may then proceed to generate a user profile (block 820). For instance, the user device 105 may extract the average of the numerical values of the user state, the average user mode, and/or the average user mood ("baseline data"), and initiate a user profile with the baseline data. The user profile may also store subsequent data regarding user preferences in the user preference data, and deviations from the baseline engagement (measured/obtained by the user device 105).

In response to determining the baseline engagement has been established or after the user profile has been generated (block 810: Yes), the user device 105 may then proceed to perform a reaction trigger process (block 825). For instance, the user device 105 may perform the reaction trigger process as discussed below with reference to FIG. 10.

The user device 105 may then proceed to update the user profile (block 830). For instance, the user device 105 may determine (or transmit to the server 115 a request for the server 115 to determine) updated preferences for the user based on reactions obtained during the reaction trigger process. Moreover, the user device 105 may update the user profile with the deviations stored in the user profile. In this manner, the user device 105 may recognize change in the baseline, and ensure the baseline reflects the user's baseline engagement state.

Figure 9:
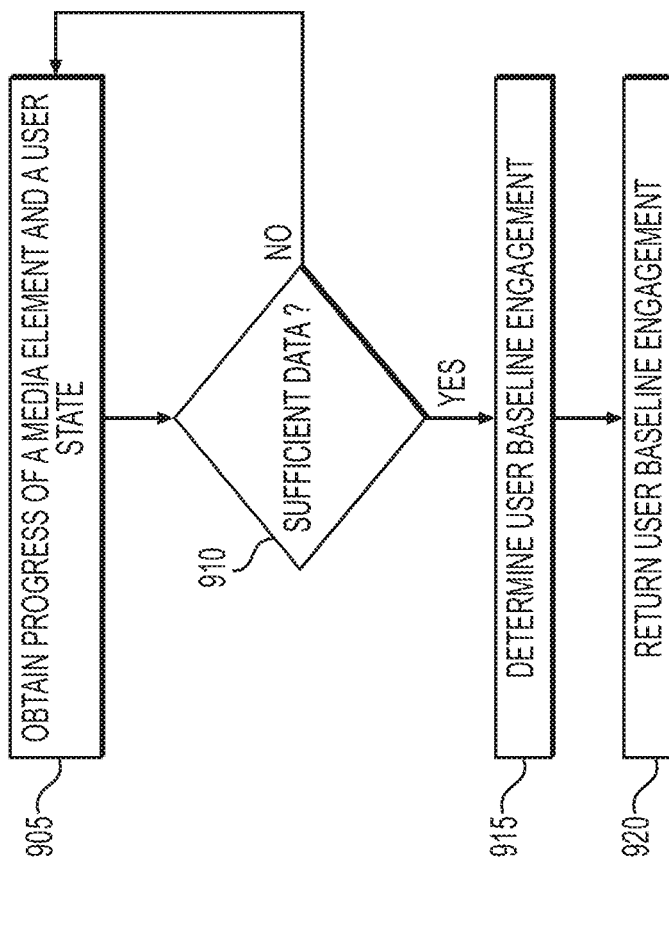

FIG. 9 depicts a flowchart 900 for performing a baseline engagement process as in block 815 of FIG. 8. The user device 105 may start the process of the flowchart 900 by obtaining a progress of a media element and a user state (block 905), as obtained in block 805 of FIG. 8 above. The user device 105 may then proceed to determine whether there is sufficient data (block 910). For instance, to determine whether there is sufficient data, the user device 105 may determine whether a length of time of tracking a user state is more than a threshold time (e.g., at least thirty seconds); the user state is within a first range (e.g., in a calm/average/steady range); changes in the user state are below a threshold value; and/or tracking devices are gathering a defined minimum set of tracking data. The defined minimum may be set by an author of a transition-coded media. As an example, the defined minimum set of tracking data may include: heart rate of the user of user device 105, audio recording of the user of user device 105, and/or video recording of the user of user device 105.

In response to determining there is not sufficient data (block 910: No), the user device 105 may proceed to return to obtain the progress of the media element and the user state (block 905). In response to determining there is sufficient data (block 910: Yes), the user device 105 may then proceed to determine the user baseline engagement (block 915).

For instance, the user device 105 may determine the baseline engagement based on the user state and the progress of the media element. Specifically, the user device 105 may: determine a time window for the baseline engagement; select a sub-set of the user state based on the time window (e.g., select a portion of the data stream of values of the user state in accordance with the time window); and determine the baseline engagement based on the sub-set of the user state and the progress of the media element.

To determine the baseline engagement based on the sub-set of the user state and the progress of the media element, the user device 105 may determine whether the progress of the media element indicates a portion of the media element that is acceptable to perform the baseline engagement process (e.g., have not yet started interacting with the media element, opening credits of a movie, starting portion of a song, etc.), or that any progress point is acceptable. The transition-coded media may indicate portions (or all) of the media element are acceptable by including baseline engagement tags. The baseline engagement tags may include a start tag indicating a starting progress point and an end tag indicating an ending progress point, with any progress point in between indicated as acceptable to perform the baseline engagement process. In response to determining the progress of the media element indicates a portion of the media element that is not acceptable, the user device 105 may return to obtain the progress of the media element and the user state (block 905).

In response to determining the progress of the media element indicates a portion of the media element that is acceptable, the user device 105 may perform a time series analysis of the sub-set of the user state to determine the baseline engagement. For instance, the time series analysis of the sub-set of the user state may calculate a moving average (e.g., one or a combination of a simple, weighted, cumulative, or exponential moving average function) of numerical values of the user state (e.g., a moving average of the user's heart rate) and determine an average user mode and user mood for the window of time. To determine the average user mode and user mood for the window of time, the user device 105 may statistically analyze the user mode and user mood during the window of time to determine a most common (e.g., highest frequency) and/or most recent user mode and user mood. Specifically, the user device 105 may determine frequency of each mode/mood and a most recent mode/mood. If the highest frequency mode/mood is the same the as the most recent mode/mood (e.g., an agreed mode/mood), the user device 105 may determine the agreed mode/mood as the average mode/mood. If there is a tie for highest frequency mode/mood (or the highest frequency mode/mood is within a threshold frequency of the second highest frequency), the user device 105 may determine the most recent mode/mood as the average mode/mood. Generally, the user device 105 may determine the average user mode and user mood based on tie-breaker rules and statistics features of the sub-set of the user state for each mode/mood in the window of time. The statistics features of the sub-set of the user state may be determined according to frequency-domain analysis methods and/or time-domain analysis methods. The tie-breaker rules may take as inputs the statistics features and proceed to determine a user mode and mood, in a similar manner as discussed in the preceding paragraph. One skilled in art would understand that this rule-based statistical analysis may be varied in numerous ways.

The user device 105 may then proceed to return user baseline engagement (block 920). For instance, the user device 105 may then return to block 815 and continue to block 820 of FIG. 8.

Figure 10:
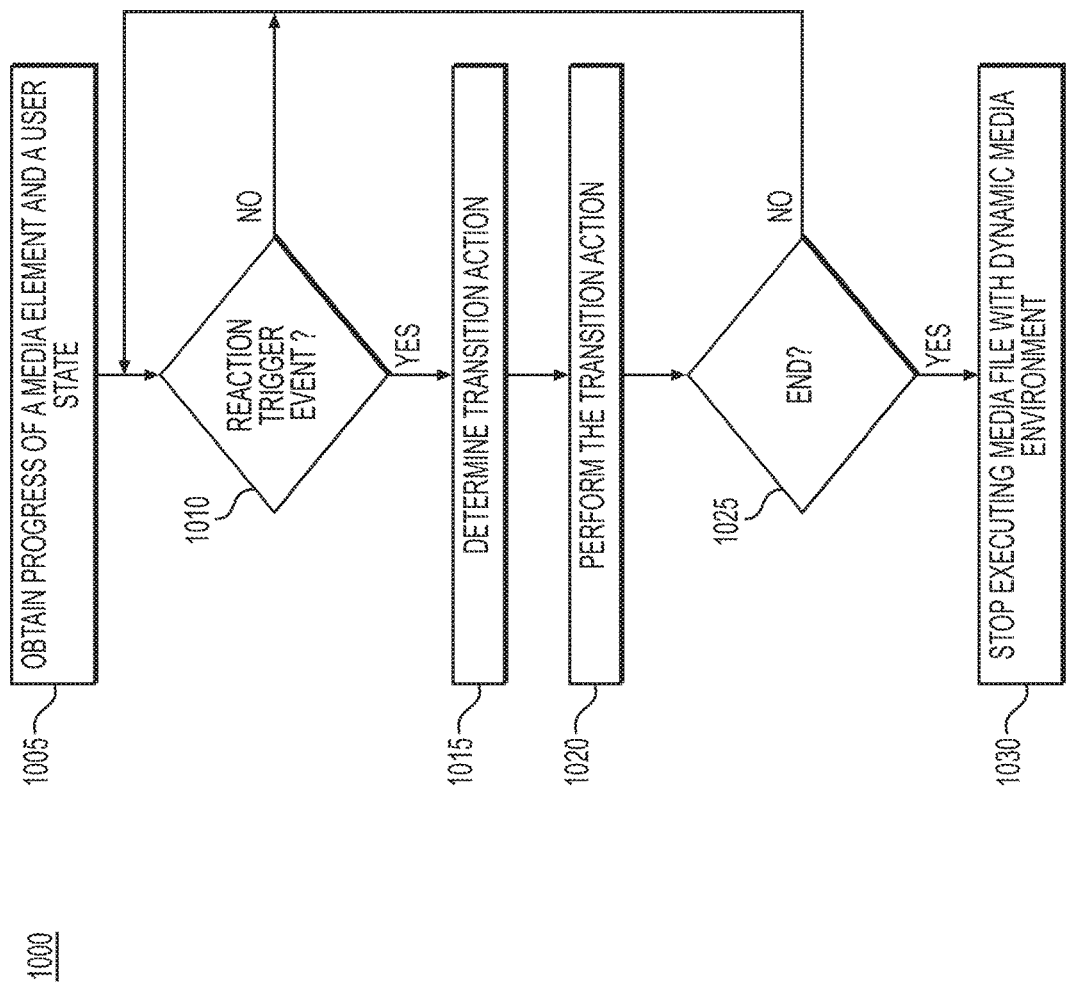

FIG. 10 depicts a flowchart 1000 for performing the reaction trigger process as discussed above with reference to block 825 of FIG. 8. Flowchart 1000 is similar to flowchart 300 of FIG. 3 discussed above, except that the tag is a reaction tag and, importantly, the determining of the transition action (block 1015) further includes the flowchart of FIG. 11.

Figure 11:
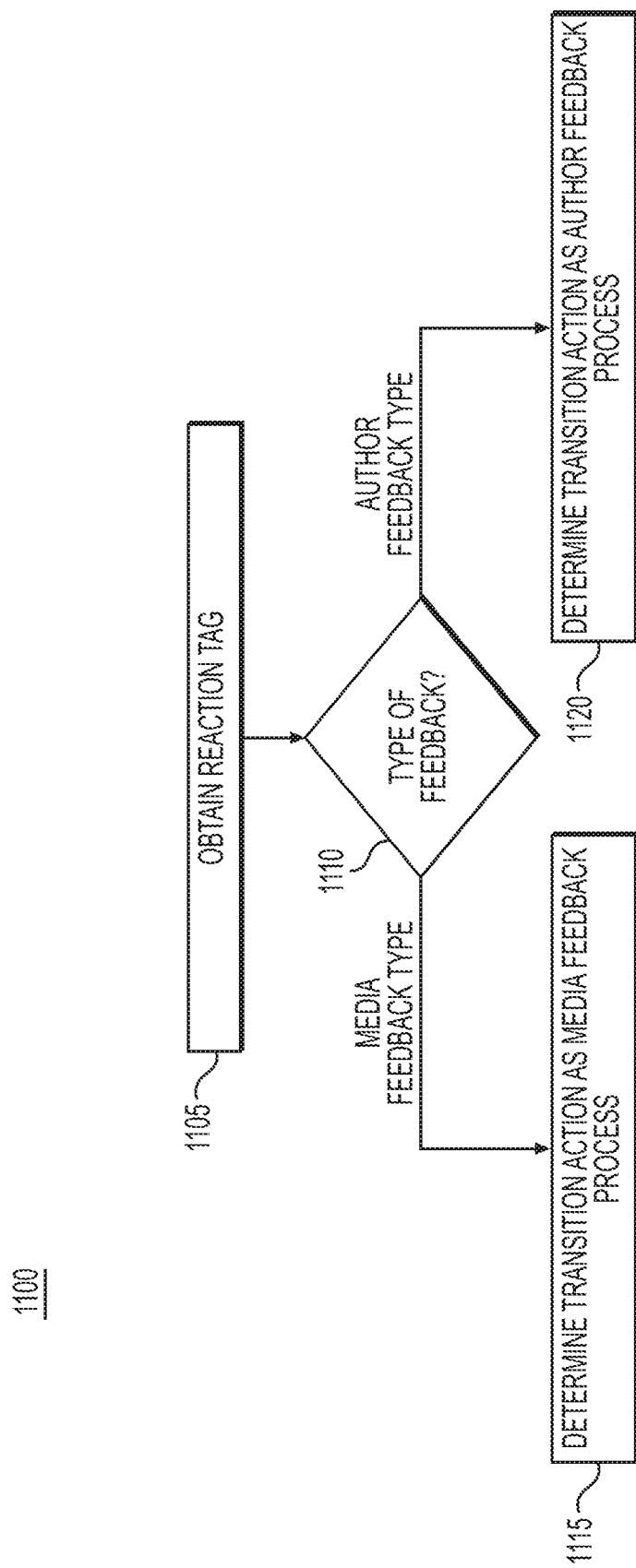

FIG. 11 depicts a flowchart 1100 for determining a transition action for a reaction tag. The user device 105 may start the process of the flowchart 1100 by obtaining a reaction tag (block 1105). For instance, the user device 105 may have been passed the trigger event and reaction tag from block 615 of FIG. 6.

The user device 105 may then proceed to determine a type of feedback (block 1110). For instance, the user device 105 may extract a feedback type from the reaction tag; and determine whether the feedback type is a media feedback type and/or an author feedback type.

In response to determining the type of feedback is the media feedback type (block 1110: Media Feedback Type), the user device 105 may proceed to determine a transition action as media feedback process (block 1115). In response to determining the type of feedback is the author feedback type (block 1110: Author Feedback Type), the user device 105 may then proceed to determine a transition action as an author feedback process (block 1120).

The user device 105 may then proceed to return the transition action as the media feedback process and/or the author feedback process so that the user device 105 may perform the transition action (block 1020).

Figure 12:
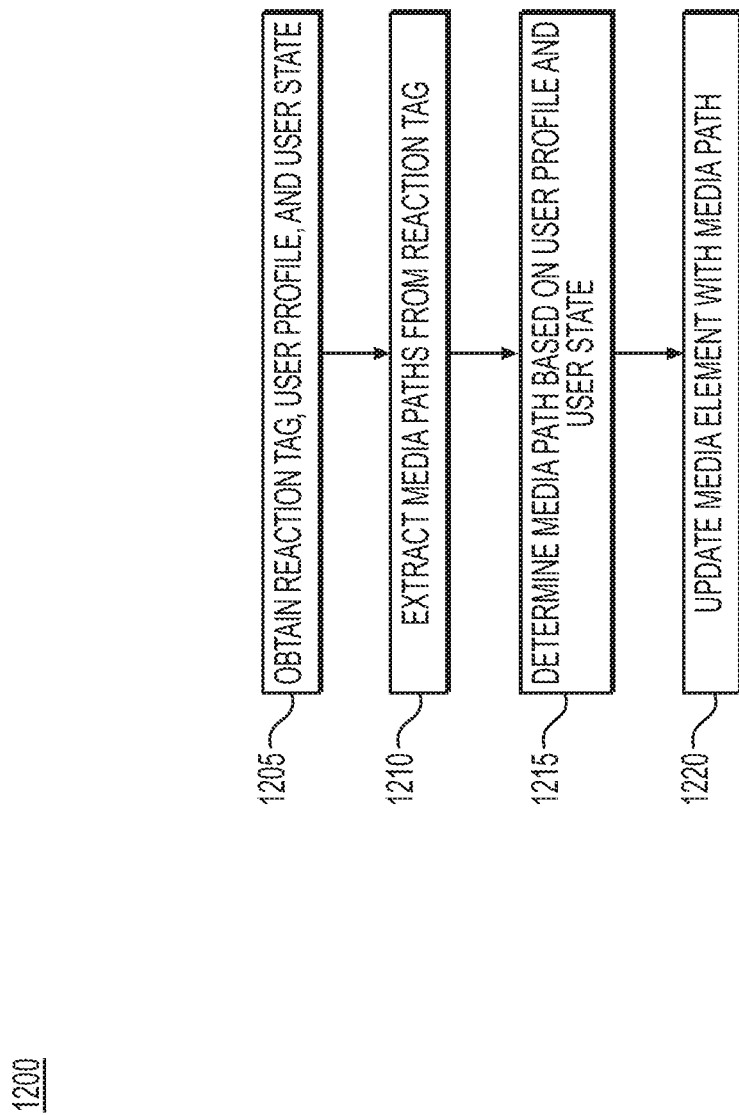
Figure 13:
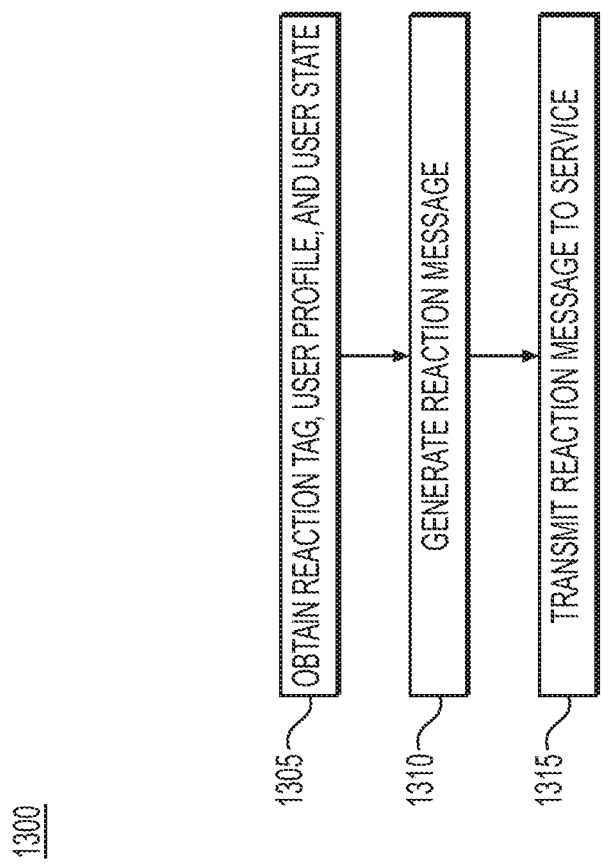

Specifically, FIG. 12 depicts a flowchart 1200 for the media feedback process. Meanwhile, FIG. 13 depicts a flowchart 1300 for the author feedback process.

Turning to flowchart 1200 for the media feedback process, the user device 105 may start the process of the flowchart 1200 by obtaining the reaction tag, a user profile, and a user state (block 1205). For instance, the user device 105 may obtain the user ID and extract the user profile from the user data using the user ID; obtain the user state as discussed above; and obtain the reaction tag from the transition-coded media.

The user device 105 may then proceed to extract media paths from reaction tag (block 1210). Reaction tags may include one or more media paths that provide one or more changes to content of the media element. Each media path may correspond to certain preferences for types of media, sections of the media element, and/or objects of content of the media element. For instance, the user device 105 may parse the reaction tag, and extract the media paths.

The user device 105 may then proceed to determine a media path based on the user profile and the user state (block 1215). For instance, the user device 105 may determine whether any preferences from the user preference data of the user data match any preferences of the media paths; if one media path matches a user preference, the user device 105 may select that media path; if more than one media path matches, the user device 105 may select one of the media paths based on priority rules. The priority rules may select a media path corresponding to a strongest preference of a user's preference (by default) but, generally, are definable by the author.

The user device 105 may then proceed to update the media element with the media path (block 1220). For instance, the user device 105 may alter the media element to include the media path in place of the default media path.

Turning to flowchart 1300 for the author feedback process, the user device 105 may start the process of the flowchart 1300 by obtaining the reaction tag, a user profile, and a user state (block 1305). For instance, the user device 105 may obtain the user ID and extract the user profile from the user data using the user ID; obtain the user state as discussed above; and obtain the reaction tag from the transition-coded media.

The user device 105 may then proceed to generate a reaction message (block 1310). For instance, the user device 105 may generate the reaction message based on the progress of the media element, the user state, and/or the user profile. The reaction message may also include the user ID and a component ID of the reaction tag.

The user device 105 may then proceed to transmit the reaction message to a service (block 1315). Once the reaction message is transmitted, the server 115 may proceed as discussed in FIG. 18 below.

Examples of the systems and methods of this aspect of the disclosure:

Example 1: A user is reading a book (a transition-coded media) on the user device 105. The book may have character tags associated with reaction tags for the character tags. The character tags may correspond to characters A-E at progress points indicating scenes in which one or more characters A-E are present. As the user device 105 may have a baseline engagement established for the user, the reaction tags may measure deviations from the baseline for each scene with a character tag. The deviations from the baseline may be a measure of an engagement intensity of the user for a character. For instance, the user device 105 may obtain the user's state and compare values to the baseline to detect deviations. To detect deviations, the user device 105 may determine any change more than a deviation threshold (e.g., 5%) from the baseline is a deviation indicating an increase in engagement or a decrease in engagement (referred to as engagement intensity (EI) below).

The user device 105 may also generate EI profiles for characters/objects based on user inputs (e.g., in response to a prompt tag) and/or machine learning models. The EI profiles may classify a user's reaction to a character/object as a particular human emotion or level interest. EI profiles may inform the author how to best create atmospheric moods in media that drive different types of emotion.

TABLE 1

Summary of Example User EI and EI Profile

| Character/Object | EI | EI Profile | Scene 1 | Scene 2 | ... | Scene N |
|---|---|---|---|---|---|---|
| A (character tag A) | +30% EI | Crush | 60% | −40% | ... | 60% |
| B (character tag B) | −50% EI | Dislike | −100% | 10% | ... | −100% |
| C (character tag C) | +20% EI | Admire | 20% | 50% | ... | 20% |
| B + C (character tag B + C) | −60% EI | Bored | −200% | −80% | ... | −200% |
| D (character tag D) | +20% EI | Interested | 10% | 50% | ... | 10% |
| E (character tag E) | +10% EI | Intrigued | 10% | −5% | ... | 10% |

Example 2: On a display adjacent to an ATM information/images may be displayed (e.g., a card offering, highlighted by a celebrity or spokesperson) as transition-coded media. The ATM may have a camera, and the ATM could be integrated into the display. During a plurality of user's interactions with the ATM, the camera (acting a tracking device) may detect that the users are looking at a particular section of the information/images on the display; a reaction tag may be triggered by the users looking at the particular section of the information/images on the display causing an author feedback process regarding the users' heightened interested in the particular section of the information/images on the display. The author of the information/images may then use the information of the users' heightened interested to change the information/images or more efficiently prepare future information/images.

Example 3: Same as Example 2 above, but instead the information/images may be different in different locations (or changed during periods of the day, etc.) and the transition-coded media may monitor user reactions to the different information/images and/or a user's interest in a particular section of the information/images. The author of the information/images may then use the user reactions to determine features of the different information/images to change the information/images to use a higher interest information/images or more efficiently prepare future information/images.

Therefore, in this aspect of the disclosure, the systems and methods of the present disclosure may track a user's state and (1) perform actions on a conditional basis of the user's state; (2) change the content of the media file based on the user's state; and/or (3) provide reaction data to the server 115. Therefore, the user device 105 may enable user-specific experiences of transition-coded media and enable authors to track how effective the media file and tags are causing users to react. Additionally, the user device 105 may track the user's state to determine how engaged the user is with the content (in general and characters/object/sections of media files in particular). Therefore, authors may be informed of how effective content of the media file and/or a component (e.g., a particular tag) is at causing change in a user's state.

Figure 14:
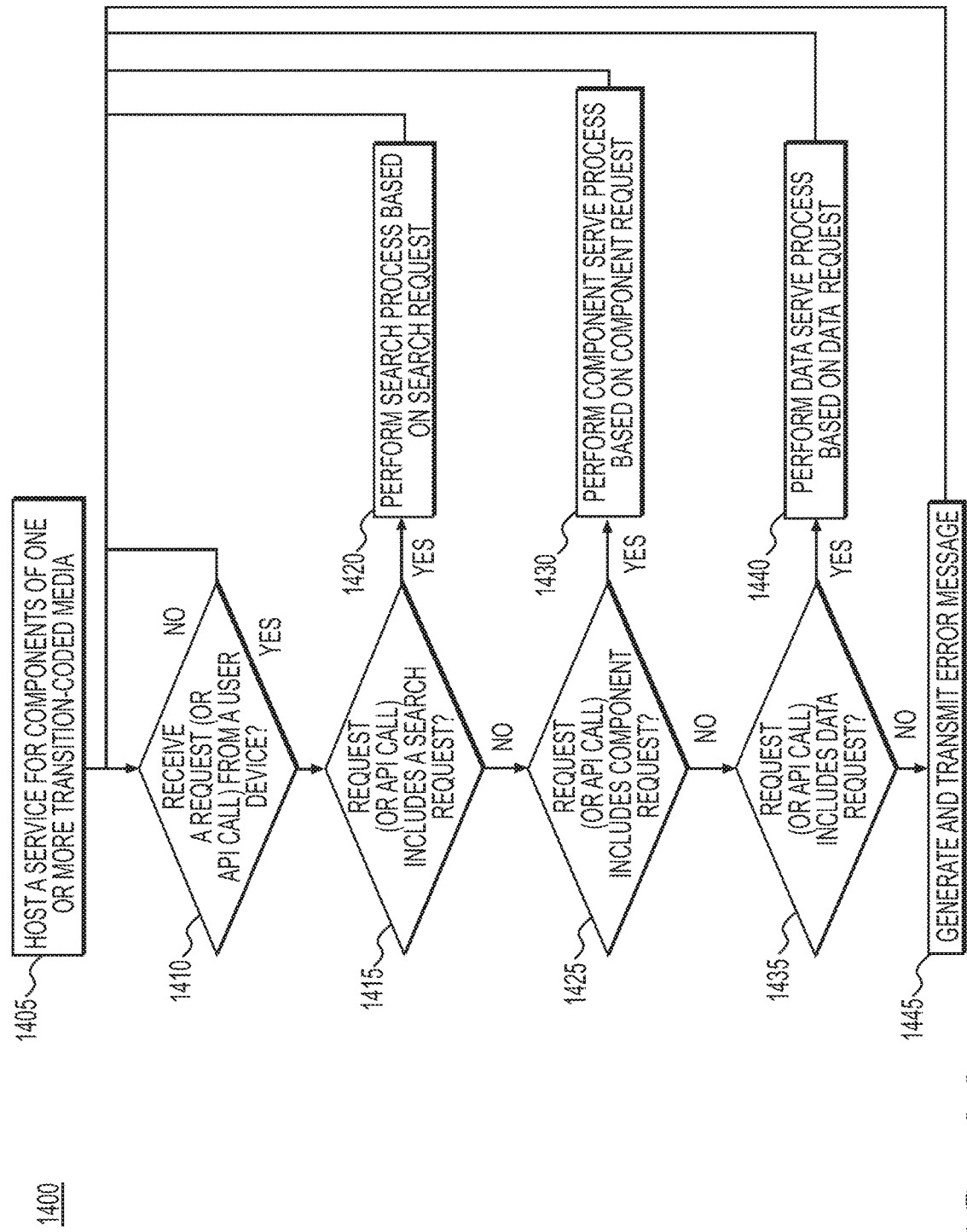
FIGS. 14-18 depict flowcharts for distribution of components of transition-coded media, according to one or more embodiments.

FIGS. 14-18 depict flowcharts for distribution of components of transition-coded media, according to one or more embodiments. FIG. 14 depicts a flowchart 1400 for distribution of components of transition-coded media. Generally, the user device 105 (when acting as an authoring device) and the server 115 may cooperate to enable distribution of components of transition-coded media.

The server 115 may start the process of the flowchart 1400 by hosting a service for components of one or more transition-coded media (block 1405). For instance, the server 115 may host the service as a marketplace to (1) gather and publish data of components of transition-coded media and (2) distribute components for authors to use in generating transition-coded media.

The server 115 may then proceed to determine whether the service has received a request from a user device (block 1410). For instance, the server 115 may initiate processes in response to receiving messages from user devices, as discussed in more detail below. Generally, requests may be messages or API calls, in accordance with an application program interface format capable of being processed by the service.

In response to determining the service has not received a request from a user device (block 1410: No), the server 115 may return to determine whether the service has received a request from a user device (block 1410). In response to determining the service has received a request from a user device (block 1410: Yes), the server 115 may then proceed to determine whether the request includes a search request (block 1415). For instance, the server 115 may analyze the request and determine whether the request includes a search indicator and, if so, determine the request includes a search request. A search request may include one or more search parameters with one or more logical operators linking the one or more search parameters.

In response to determining the request includes the search request (block 1415: Yes), the server 115 may then proceed to perform a search process based on the search request (block 1420). For instance, the server 115 may perform a search process as discussed below with reference to FIG. 15. After performing the search process, the server 115 may proceed to return to determine whether the service has received a request from a user device (block 1410). In response to determining the request does not include the search request (block 1415: No), the server 115 may proceed to determine whether the request includes a component request (block 1425). For instance, the server 115 may analyze the request and determine whether the request includes a component serve indicator and, if so, determine the request includes a component request. A component request may include one or more component IDs.

In response to determining the request includes the component request (block 1425: Yes), the server 115 may then proceed to perform a component serve process based on the component request (block 1430). For instance, the server 115 may perform a component serve process as discussed below with reference to FIG. 16. After performing the component serve process, the server 115 may proceed to return to determine whether the service has received a request from a user device (block 1410). In response to determining the request does not include the component request (block 1415: No), the server 115 may proceed to determine whether the request includes a data request (block 1435). For instance, the server 115 may analyze the request and determine whether the request includes a data serve indicator and, if so, determine the request includes a data request. A data request may include one or more component IDs.

In response to determining the request includes the data request (block 1435: Yes), the server 115 may then proceed to perform a data serve process based on the data request (block 1440). For instance, the server 115 may perform a data serve process as discussed below with reference to FIG. 17. After performing the data serve process, the server 115 may proceed to return to determine whether the service has received a request from a user device (block 1410). In response to determining the request does not include the data request (block 1415: No), the server 115 may proceed to generate and transmit an error message (block 1445). After transmitting the error message, the server 115 may proceed to return to determine whether the service has received a request from a user device (block 1410).

Figure 15:
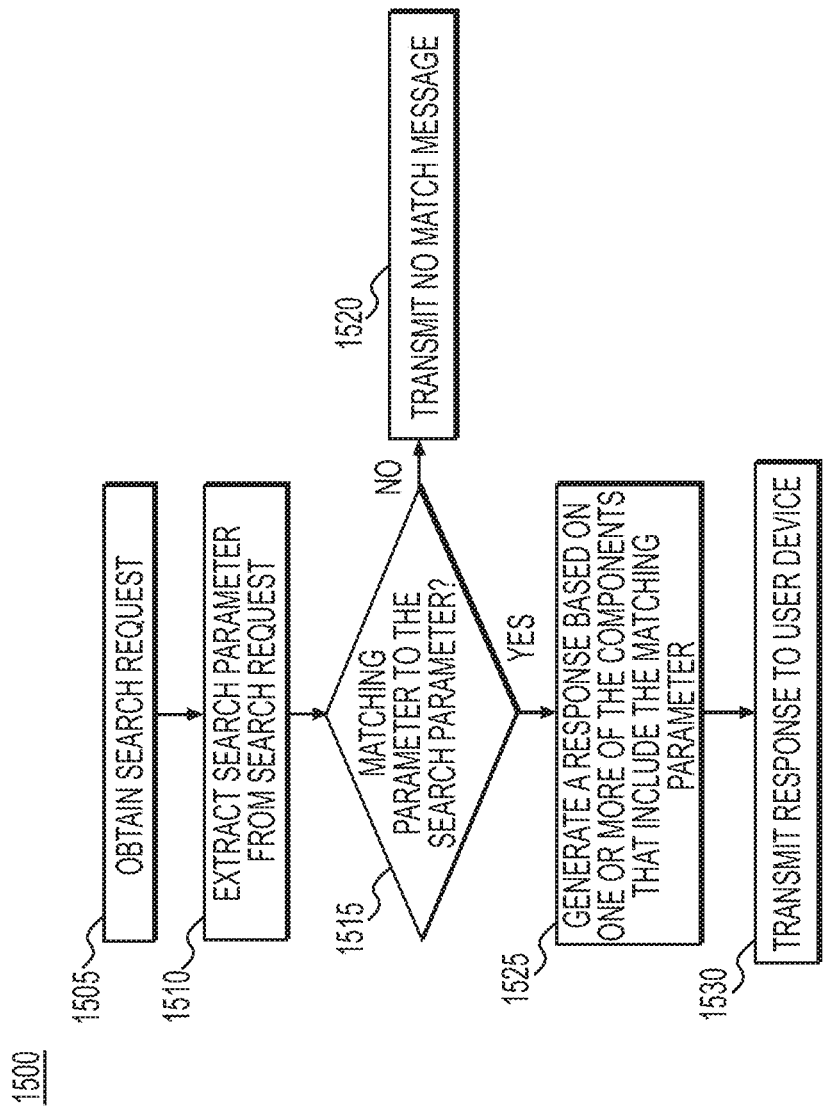

FIG. 15 depicts a flowchart 1500 for a search process. The server 115 may start the process of the flowchart 1500 by obtaining a search request (block 1505). For instance, the server 115 may obtain the search request by extracting the search request from the request received in FIG. 14 above.

The server 115 may then proceed to extract a search parameter from the search request (block 1510). For instance, the server 115 may parse the search request and obtain one or more search parameters. The search parameters may include terms, IDs, words, and/or numbers (generally, an alphanumeric string), for a search of a database of component IDs, descriptions, functionality, names, labels, etc. associated with components of one or more transition-coded media.

The server 115 may then proceed to determine whether one or more components have a matching parameter to the search parameter (block 1515). For instance, the server 115 may access the database and determine whether an alphanumeric string of the component IDs, descriptions, functionality, names, labels match the alphanumeric string of the search parameter. One of skill in the art would understand that the above description for a single search parameter is exemplary and not intended to exclude multiple search parameters linked by logical operators, or search in a free form manner using search parameters.

In response to determining none of the one or more components have a matching parameter to the search parameter (block 1515: No), the server 115 may proceed to transmit a no match message to the user device 105 (block 1520). For instance, the no match message may indicate that no components have a matching parameter. In response to determining at least one of the one or more components have a matching parameter to the search parameter (block 1515: Yes), the server 115 may then proceed to generate a response based on the one or more components that include the matching parameter (block 1525). For instance, the server 115 may generate a search result page with information corresponding to the one or more components that include the matching parameter. The server 115 may then proceed to transmit the response to the user device 105 (block 1530).

Figure 16:
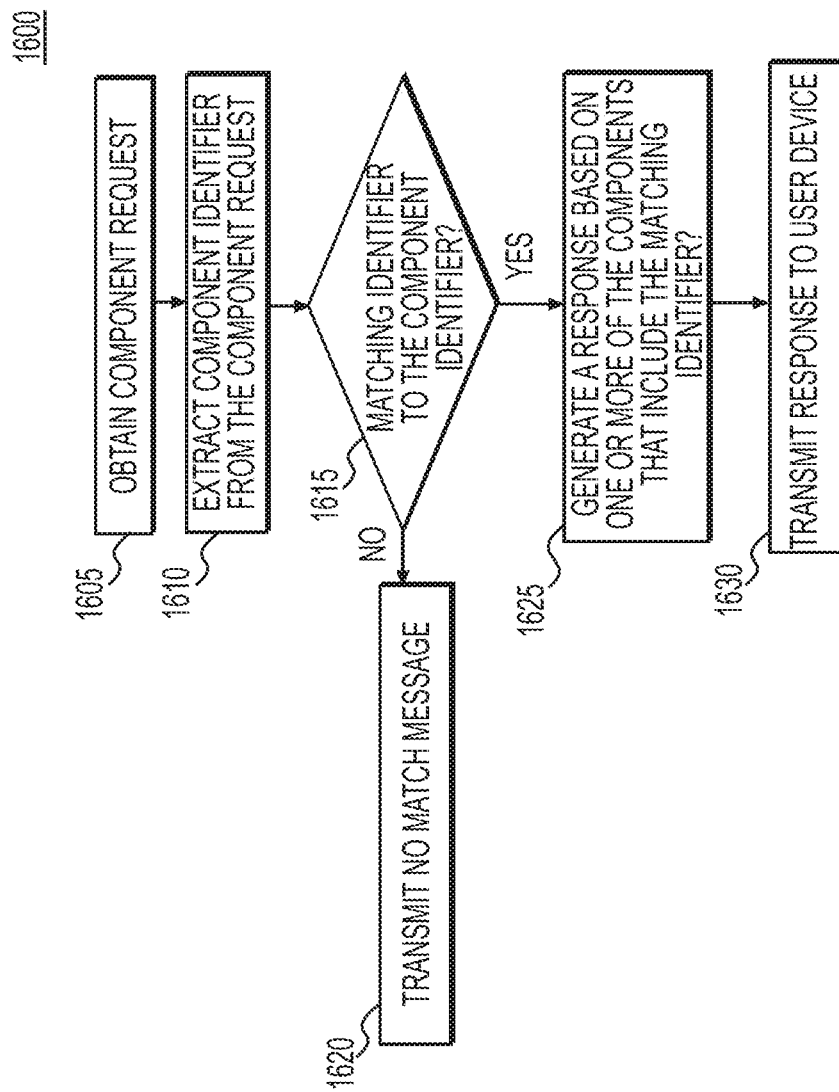

FIG. 16 depicts a flowchart 1600 for a component server process. The server 115 may start the process of the flowchart 1600 by obtaining a component request (block 1605). For instance, the server 115 may obtain the component request by extracting the component request from the request received in FIG. 14 above.

The server 115 may then proceed to extract a component ID from the component request (block 1610). For instance, the server 115 may parse the component request and obtain one or more component IDs. The component IDs may be terms, IDs, words, and/or numbers (generally, an alphanumeric string), for a search of the database for component IDs corresponding to components of one or more transition-coded media.

The server 115 may then proceed to determine whether one or more components have a matching ID to the component ID (block 1615). For instance, the server 115 may access the database and determine whether an alphanumeric string of the component IDs of the database match the alphanumeric string of the component ID of the request. One of skill in the art would understand that the above description for a single component ID is exemplary and not intended to exclude multiple component IDs.

In response to determining none of the one or more components have a matching ID to the component ID (block 1615: No), the server 115 may proceed to transmit a no match message to the user device 105 (block 1620). For instance, the no match message may indicate that no components have a matching component ID. In response to determining at least one of the one or more components have a matching ID to the component ID (block 1615: Yes), the server 115 may then proceed to generate a response based on the one or more components that include the matching ID (block 1625). For instance, the server 115 may generate a search result page with information corresponding to the one or more components that include the matching ID, and/or transmit the framework(s) for the one or more components that include the matching ID. The server 115 may then proceed to transmit the response to the user device 105 (block 1630).

Figure 17:
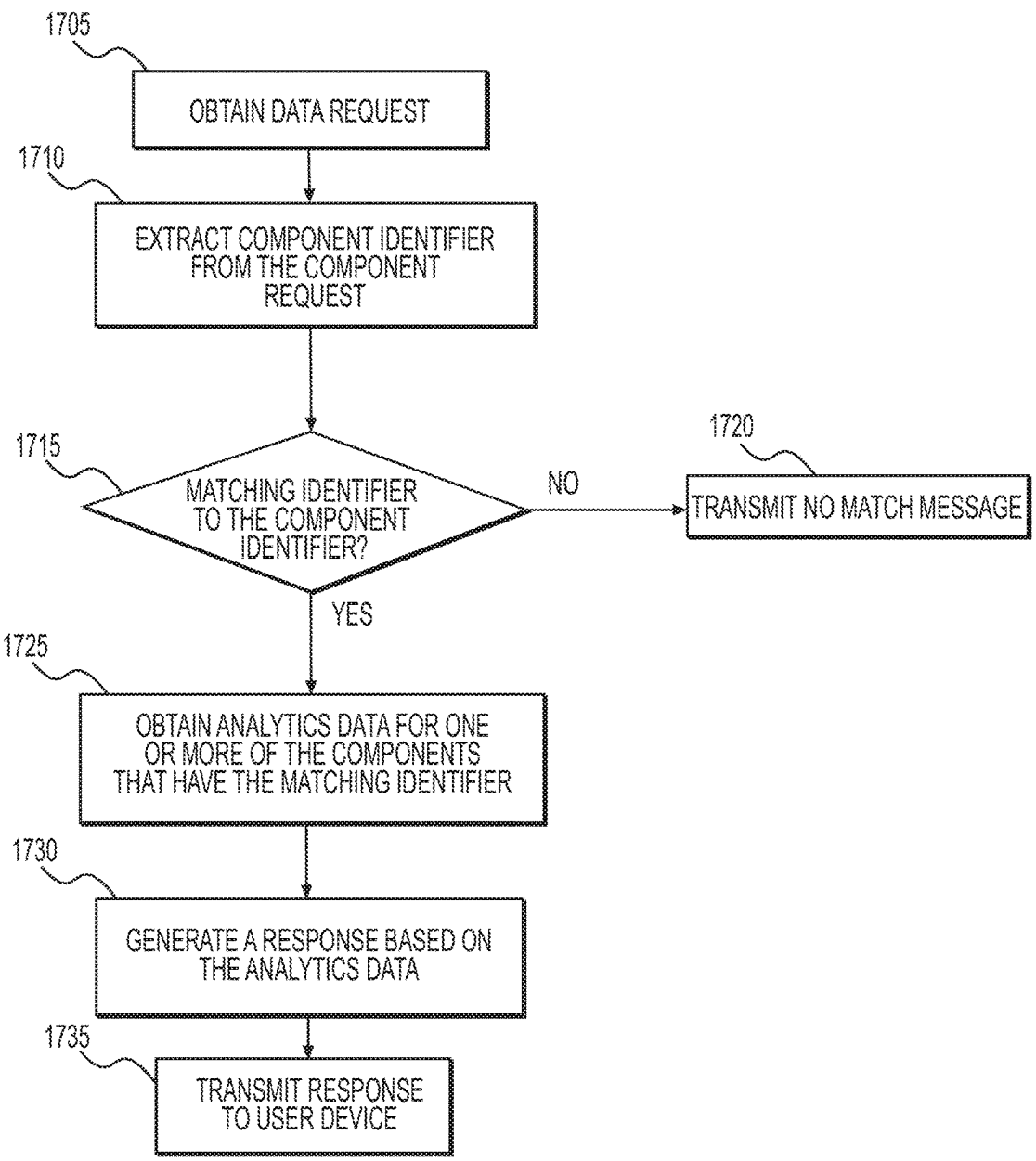

FIG. 17 depicts a flowchart 1700 for a data serve process. The server 115 may start the process of the flowchart 1700 by obtaining a data request (block 1705). For instance, the server 115 may obtain the data request by extracting the data request from the request received in FIG. 14 above.

The server 115 may then proceed to extract a component ID from the component request (block 1710). For instance, the server 115 may parse the component request and obtain one or more component IDs. The component IDs may be terms, IDs, words, and/or numbers (generally, an alphanumeric string), for a search of the database for component IDs corresponding to components of one or more transition-coded media.

The server 115 may then proceed to determine whether one or more components have a matching ID to the component ID (block 1715). For instance, the server 115 may access the database and determine whether an alphanumeric string of the component IDs of the database match the alphanumeric string of the component ID of the request. One of skill in the art would understand that the above description for a single component ID is exemplary and not intended to exclude multiple component IDs.

In response to determining none of the one or more components have a matching ID to the component ID (block 1715: No), the server 115 may proceed to transmit a no match message to the user device 105 (block 1720). For instance, the no match message may indicate that no components have a matching component ID. In response to determining at least one of the one or more components have a matching ID to the component ID (block 1715: Yes), the server 115 may then obtain the analytics data for the one or more components that include the matching ID (block 1725). The analytics data may include the media engagement data for users who have interacted with a transition-coded media.

The server 115 may then proceed to generate a response based on the analytics data (block 1730). For instance, the server 115 may generate a data display page with information based on the analytics data corresponding to the one or more components that include the matching ID, and/or a report of the analytics data for the one or more components that include the matching ID to be consumed by a third-party process (e.g., billing, membership, etc.). The server 115 may then proceed to transmit the response to the user device 105 (block 1735).

Therefore, in this aspect of the disclosure, the systems and methods of the present disclosure may enable authors to search for and request components, and/or search for and request data regarding users/user reactions to components. The distributed components may enable authors to include tags into their transition-coded media to enhance a user's experience. Therefore, transition-coded media may be developed quickly and tracked for effectiveness.

Figure 18:
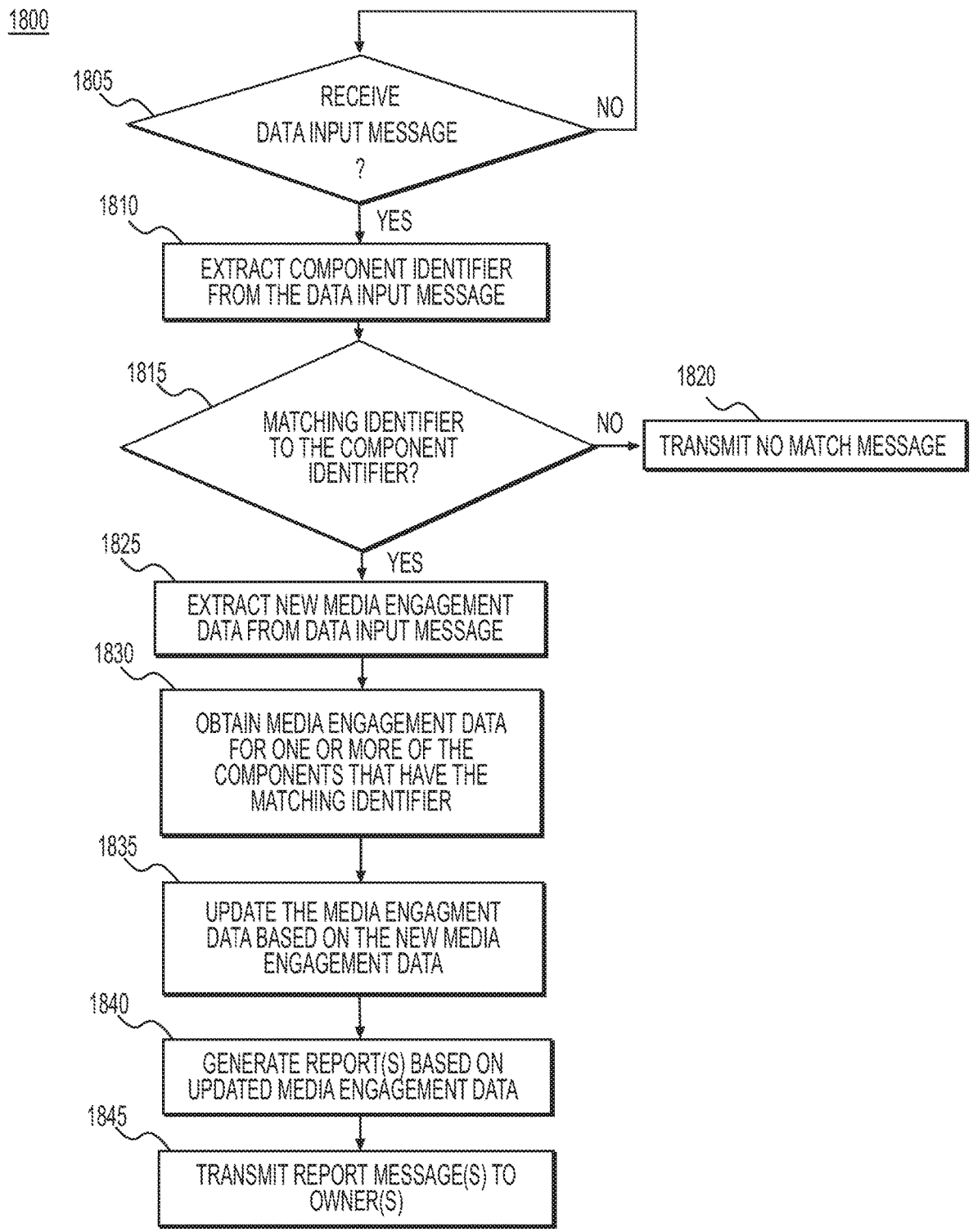

FIG. 18 depicts a flowchart 1800 for updating analytics data. The server 115 may start the process of the flowchart 1800 by determining whether the service has received a data input message from a user device (block 1805). In response to determining the service has not received a data input message from a user device (block 1805: No), the server 115 may proceed to return to determine whether the service has received a data input message from a user device (block 1805). For instance, the server 115 may analyze an incoming request and determine whether the request includes a data input serve indicator and, if so, determine the data input message has been received. The data input message may include a user ID, one or more component IDs corresponding to components of transition-coded media (e.g., a reaction tag of a media element), and new media engagement data. Generally, the data input message may be transmitted by the user device 105 to effect the author feedback type of reaction tags. The data input message may be each reaction message transmitted as the reaction tags are triggered, or the author feedback type may be a batch message including multiple reaction messages for multiple reaction tags transmitted every set period of time (e.g., once a day). In the case of the batch message, each of the multiple reaction messages may be processed separately (in sequence or in parallel) or jointly.

In response to determining the service has received a data input message from a user device (block 1805: Yes), the server 115 may then proceed to extract a component ID from the data input message (block 1810). For instance, the server 115 may parse the data input message and obtain one or more component IDs. The component IDs may be terms, IDs, words, and/or numbers (generally, an alphanumeric string), for a search of the database for component IDs corresponding to components of one or more transition-coded media, so that the analytics data of the components may be updated.

The server 115 may then proceed to determine whether one or more components have a matching ID to the component ID (block 1815). For instance, the server 115 may access the database and determine whether an alphanumeric string of the component IDs of the database match the alphanumeric string of the component ID of the request. One of skill in the art would understand that the above description for a single component ID is exemplary and not intended to exclude multiple component IDs.

In response to determining none of the one or more components have a matching ID to the component ID (block 1815: No), the server 115 may proceed to transmit a no match message to the user device 105 (block 1820). For instance, the no match message may indicate that no components have a matching component ID. In response to determining at least one of the one or more components have a matching ID to the component ID (block 1815: Yes), the server 115 may then proceed to extract the new media engagement data from the data input message (block 1825). For instance, the server 115 may parse the data input message and obtain the new media engagement data.

The server 115 may then proceed to obtain media engagement data for the one or more components that include the matching ID (block 1830). For instance, the server 115 may obtain the analytics data for the one or more components that include the matching ID, and extract the media engagement data.

The server 115 may then proceed to update the media engagement data for the one or more components that include the matching ID based on the new media engagement data extracted from the data input message (block 1835). For instance, the server 115 may update/add a dataset to the one or more reaction datasets. Specifically, the server 115 may extract a user ID from the data input message; determine whether a dataset of the plurality of datasets is associated with the user ID and the component ID by matching the user ID of the data input message to user IDs of the datasets and matching component ID of the data input message to component IDs for a component ID. If both the user ID and component ID match a dataset, the server 115 may update the matching dataset. If only one or neither of user ID and component ID match a dataset, the server 115 may add a dataset. For instance, to update the dataset, the server 115 may save each user reaction to a reaction tag, save a particular number of most recent reactions, or save only a most recent reaction to a tag. The server 115 may also update the averages and/or scores for the component ID based on the updated dataset or added dataset.

The server 115 may then proceed to generate report(s) based on updated media engagement data (block 1840). For instance, the server 115 may generate the reports at set intervals time, at set numbers of new/updated datasets for a component ID (e.g., after 100 new/updated reaction datasets by tracking a number of times the datasets for the component ID are updated/added), and/or in response to a new/updated dataset. The reports may include the averages/scores of the reaction data for the component ID, and include user summary information. The user summary information may include a number of distinct users that that have engaged with the component, a number of reactions to the component, and/or user characteristics of users that that have engaged with the component. The user characteristics may include age, gender, location, profession, etc.

The server 115 may then proceed to transmit the report message(s) to owner(s) (block 1845). The report messages may include the reports. For instance, the component ID may be associated with one or more user IDs that indicates an owner of the component on the service hosted by the server 115. An owner may be an original author of a component and/or an author of a transition-coded media element that includes the component. Additionally, the server 115 may update published data for the components corresponding to the component ID on the service.

Therefore, in this aspect of the disclosure, the systems and methods of the present disclosure may gather and publish data for components of transition-coded media, and/or gather and inform authors of user's reactions to transition-coded media. Authors may use the information to determine a success invoking particular user reactions and/or be informed of how engaged users are with content of the media file.

Figure 19:
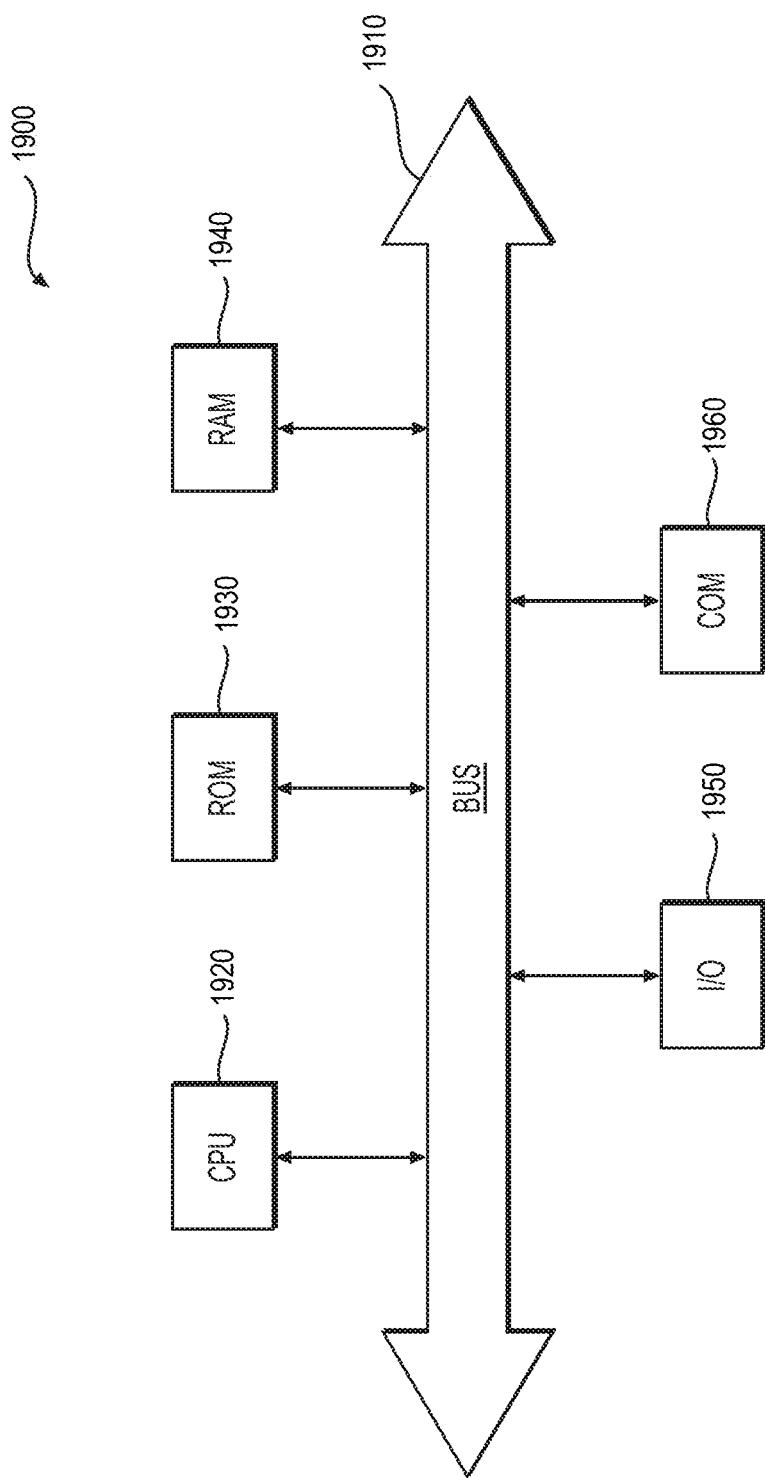
FIG. 19 depicts an example system that may execute techniques presented herein.

FIG. 19 depicts an example system that may execute techniques presented herein. FIG. 19 is a simplified functional block diagram of a computer that may be configured to execute techniques described herein, according to exemplary embodiments of the present disclosure. Specifically, the computer (or "platform" as it may not be a single physical computer infrastructure) may include a data communication interface 1960 for packet data communication. The platform may also include a central processing unit ("CPU") 1920, in the form of one or more processors, for executing program instructions. The platform may include an internal communication bus 1910, and the platform may also include a program storage and/or a data storage for various data files to be processed and/or communicated by the platform such as ROM 1930 and RAM 1940, although the system 1900 may receive programming and data via network communications. The system 1900 also may include input and output ports 1950 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for transition-coded media, comprising:
obtaining a media file having a format;
determining whether the media file includes transition-coded media by detecting one or more tags, the transition-coded media including a media element and the one or more tags, the one or more tags being associated with one or more progress points in the media element;
in response to determining the media file includes the transition-coded media, establishing a dynamic media environment;
detecting whether a user is interacting with the transition-coded media by using a user device; and
in response to detecting the user is interacting with the transition-coded media by using the user device, executing the transition-coded media with the dynamic media environment by:
tracking a progress of the media element executed on the user device and a user state;
determining that a trigger event occurs in response to the progress of the media element reaching a predetermined progress point of the one or more progress points associated with a predetermined tag of the one or more tags;

in response to determining the trigger event occurs, determining a transition action based on the trigger event by:

extracting information for one or more tag device actions and information for one or more tag devices from the tag corresponding to the trigger event;

identifying the one or more tag devices based on the extracted information, wherein the one or more tag devices are configured to execute the one or more tag device actions and wherein the one or more tag devices are different than the user device and wherein the one or more tag devices cannot execute content having a same format as the format of the media element;

determining the transition action based on the tag devices and the one or more tag device actions; and causing the transition action to be performed by the one or more tag devices while continuing to execute the transition-coded media on the user device.

2. The method of claim 1, wherein the tracking the progress of the media element executed on the user device and the user state includes:

sending instructions to at least one tracking device to track the user;

receiving tracking data from the at least one tracking device; and processing the tracking data to determine the user state.

3. The method of claim 2, wherein the tracking the progress of the media element executed on the user device and the user state further includes:

determining whether the media element is a static media element or data stream media element, and performing one of:

in response to determining the media element is a static media element, determining the progress of the media element based on the user state; or in response to determining the media element is a data stream media element, determining the progress of the media element based on time.

4. The method of claim 1, wherein the determining the transition action based on the trigger event includes:

determining whether the tag includes a condition; and in response to determining the tag does not include a condition, determining the transition action based on the tag.

5. The method of claim 1, wherein the determining the transition action based on the trigger event includes:

determining whether the tag includes a condition;

in response to determining the tag does include a condition, determining whether the condition is satisfied based on the progress of the media element and/or the user state; and in response to determining the condition is satisfied, determining the transition action based on the tag.

6. The method of claim 1, wherein causing the transition action to be performed further includes:

sending instructions to the tag devices to perform at least one tag device action of the one or more tag device actions in accordance with the tag, wherein the at least one tag device action modifies the tag devices based on a user specific environmental control.

7. The method of claim 1, wherein the establishing the dynamic media environment includes:

obtaining location data for the dynamic media environment, the location data including information about one or more dynamic media environment enabled devices; and initializing the one or more dynamic media environment enabled devices.

8. The method of claim 7, the establishing the dynamic media environment further includes, before the obtaining the location data:

determining a location of the dynamic media environment;

determining whether the location is one of one or more known locations;

in response to determining the location is one of one or more known locations, obtaining the location data stored in a memory; and in response to determining the location is not one of one or more known locations, executing a search process for dynamic media environment enabled devices to generate the location data.

9. A system for transition-coded media, the system comprising:

a memory storing instructions; and a processor executing the instructions to perform a process including:

obtaining a media file having a format;

determining whether the media file includes transition-coded media by detecting one or more tags, the transition-coded media including a media element and the one or more tags, the one or more tags being associated with one or more progress points in the media element;

in response to determining the media file includes the transition-coded media, establishing a dynamic media environment by:

obtaining location data for the dynamic media environment, the location data including information about one or more dynamic media environment enabled devices, and initializing the one or more dynamic media environment enabled devices;

detecting whether a user is interacting with the transition-coded media by using a user device; and in response to detecting the user is interacting with the transition-coded media by using the user device, executing the transition-coded media with the dynamic media environment by:

tracking a progress of the media element executed on the user device and a user state;

determining that a trigger event occurs in response to the progress of the media element reaching a predetermined progress point of the one or more progress points associated with a predetermined tag of the one or more tags;

in response to determining the trigger event occurs, determining a transition action based on the trigger event by:

extracting information for one or more tag device actions and information for one or more tag devices from the tag corresponding to the trigger event;

identifying the one or more tag devices based on the extracted information, wherein the one or more tag devices are configured to execute the one or more tag device actions and wherein the one or more tag devices are different than the user device and wherein the one or more tag devices cannot execute content having a same format as the format of the media element;
determining the transition action based on the tag devices and the one or more tag device actions; and
causing the transition action to be performed by the one or more tag devices while continuing to execute the transition-coded media on the user device.

10. The system of claim 9, wherein the tracking the progress of the media element executed on the user device and the user state includes:
sending instructions to at least one tracking device to track the user;
receiving tracking data from the at least one tracking device; and
processing the tracking data to determine the user state.

11. The system of claim 10, wherein the tracking the progress of the media element executed on the user device and the user state further includes:
determining whether the media element is a static media element or data stream media element, and
performing one of:
in response to determining the media element is a static media element, determining the progress of the media element based on the user state; or
in response to determining the media element is a data stream media element, determining the progress of the media element based on time.

12. The system of claim 9, wherein the determining the transition action based on the trigger event includes:
determining whether the tag includes a condition;
in response to determining the tag does include a condition, determining whether the condition is satisfied based on the progress of the media element and/or the user state; and
in response to determining the condition is satisfied, determining the transition action based on the tag.

13. The system of claim 9, wherein causing the transition action to be performed includes:
sending instructions to the tag devices to perform at least one tag device action of the one or more tag device actions in accordance with the tag.

14. A method for transition-coded media, the method comprising:
obtaining a media file having a format;
determining whether the media file includes transition-coded media by detecting one or more tags, the transition-coded media including a media element and the one or more tags, the one or more tags being associated with one or more progress points in the media element;
in response to determining the media file includes the transition-coded media, establishing a dynamic media environment;
detecting whether a user is interacting with the transition-coded media by using a user device; and
in response to detecting the user is interacting with the transition-coded media by using the user device, executing the transition-coded media with the dynamic media environment by:
tracking a progress of a media element of the transition-coded media executed on the user device and a user state;
determining that a trigger event occurs in response to the progress of the media element reaching a predetermined progress point of the one or more progress points associated with a predetermined tag of the one or more tags;
in response to determining the trigger event occurs, determining a transition action based on the trigger event by
extracting information for one or more tag device actions and information for one or more tag devices from a predetermined tag corresponding to the trigger event;
identifying the one or more tag devices based on the extracted information, wherein the one or more tag devices are configured to execute the one or more tag device actions and wherein the one or more tag devices are different than the user device and wherein the one or more tag devices cannot execute content having a same format as the format of the media element;
determining the transition action based on the tag devices and the one or more tag device actions; and
causing the transition action to be performed by the one or more tag devices while continuing to execute the transition-coded media on the user device.

15. The method of claim 1, further comprising obtaining a media file that is not transition-coded media.

16. The method of claim 1, wherein determining that the trigger event is associated with a predetermined tag of the one or more tags comprises determining a trigger event type and comparing the trigger event type to the one or more tags.

17. The method of claim 1, wherein the one or more tags comprises a user-specific environmental control, wherein the user-specific environmental control modifies a user's environment using the tag devices.

18. The method of claim 17, wherein the user-specific environmental control is configured to modify the tag devices by modifying one or more of a heating, ventilation, or air conditioning (HVAC) property, a room lighting property, or a robotic massage chair property.

* * * * *